(12) United States Patent
Tabuchi et al.

(10) Patent No.: US 7,627,180 B2
(45) Date of Patent: Dec. 1, 2009

(54) IMAGE COMPRESSION APPARATUS

(75) Inventors: Hiroshi Tabuchi, Hyogo (JP); Akira Taguchi, Tokyo (JP); Kazuhiro Shimauchi, Tokyo (JP); Toshio Morohashi, Hyogo (JP)

(73) Assignee: TOA Corporation, Kobe-shi (JP)

( * ) Notice: Subject to any disclaimer, the term of this patent is extended or adjusted under 35 U.S.C. 154(b) by 617 days.

(21) Appl. No.: 10/589,555

(22) PCT Filed: Feb. 15, 2005

(86) PCT No.: PCT/JP2005/002259

§ 371 (c)(1),
(2), (4) Date: Aug. 16, 2006

(87) PCT Pub. No.: WO2005/079054

PCT Pub. Date: Aug. 25, 2005

(65) Prior Publication Data

US 2007/0140569 A1    Jun. 21, 2007

(30) Foreign Application Priority Data

Feb. 17, 2004 (JP) .............................. 2004-040643
Feb. 18, 2004 (JP) .............................. 2004-041212

(51) Int. Cl.
*G06K 9/36* (2006.01)
*G06K 9/46* (2006.01)

(52) U.S. Cl. ........................ 382/232; 382/240; 382/250; 382/251

(58) Field of Classification Search ................ 382/161, 382/164, 173, 232, 233, 239, 240, 244, 250, 382/251, 260–264, 300; 375/240.03, 240.11, 375/240.16, 240.19, 240.2, 240.21, 240.24, 375/240.25; 345/589, 600–604
See application file for complete search history.

(56) References Cited

U.S. PATENT DOCUMENTS 5,157,488 A * 10/1992 Pennebaker ............ 375/240.04

(Continued)

FOREIGN PATENT DOCUMENTS

| JP | 6-54310 A | 2/1994 |
| JP | 2003-116009 A | 4/2003 |
| JP | 2003-274193 A | 9/2003 |

OTHER PUBLICATIONS

K Shimauchi et al, "JPEG Based Image Compression Using Adaptive Resolution Conversion," 2003 International Symposium on Intelligent Signal Processing and Communication Systems (ISPACS 2003), Awaji Island, Japan, Dec. 7-10, 2003, pp. 379-384.

(Continued)

*Primary Examiner*—Amir Alavi
(74) *Attorney, Agent, or Firm*—Birch, Stewart, Kolasch & Birch, LLP

(57) ABSTRACT

To improve the data compression ratio in the data compression/decompression method utilizing the down-sampling process. Image data in a DS area division unit (130) is divided into a plenty of DS areas and DS areas which are not important are converted into contracted data of the block size by down-sampling in a down-sampling unit (131). A relocation unit (132) allocates two or more contracted data in one DS area, inserts file data into the other portion in the DS area, and removes the DS area where no contracted data is allocated, thereby reducing the entire image size. The image data thus contracted is inputted into a JPEG encoder (14) and subjected to a DCT process and a quantization process for each block. When performing restoration, decompression is performed by the JPEG decoder and the original location is restored. As for the contracted data, interpolation is performed to restore the image data.

4 Claims, 26 Drawing Sheets

U.S. PATENT DOCUMENTS

| | | | |
|---|---|---|---|
| 5,708,732 A * | 1/1998 | Merhav et al. | 382/232 |
| 5,774,597 A * | 6/1998 | Wilson | 382/250 |
| 7,142,598 B2 * | 11/2006 | Kim et al. | 375/240 |
| 7,218,789 B2 * | 5/2007 | Faber et al. | 382/244 |
| 2005/0226335 A1 * | 10/2005 | Lee et al. | 375/240.16 |
| 2005/0244061 A1 * | 11/2005 | Shaked et al. | 382/232 |
| 2005/0244068 A1 * | 11/2005 | Nakachi et al. | 382/240 |
| 2006/0104526 A1 * | 5/2006 | Gringeler et al. | 382/239 |
| 2007/0140569 A1 * | 6/2007 | Tabuchi et al. | 382/232 |

OTHER PUBLICATIONS

Kazuhiro Shimauchi et al , "JPEG Based Image Compression Using Adaptive Resolution Converstion," D5-4, 18th Digital Signal Processing Symposium 2003, Nov. 2003.

* cited by examiner

[Fig.1]
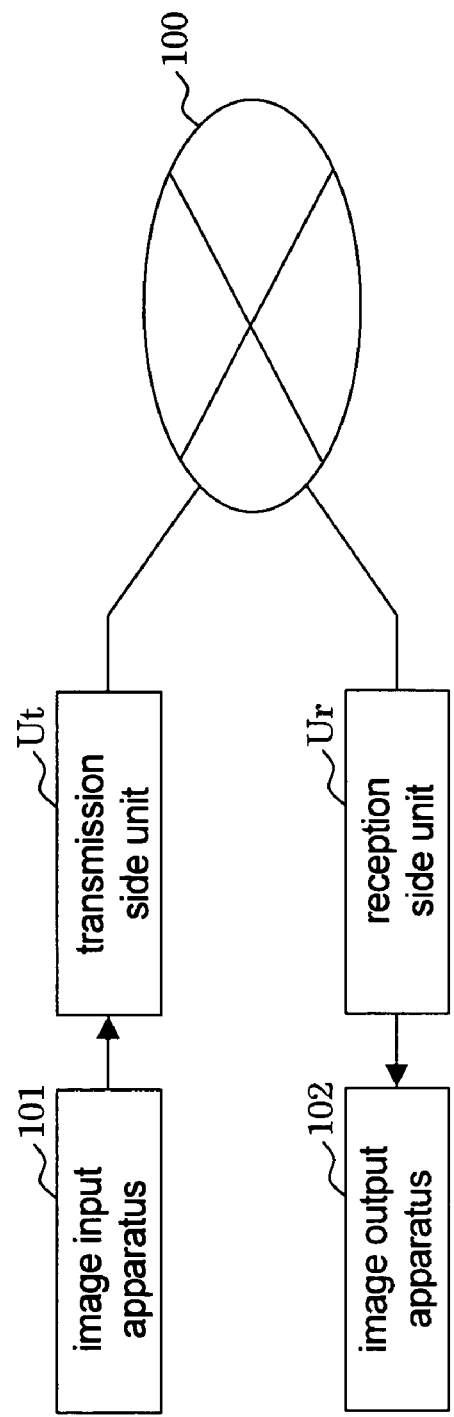

[Fig.2]
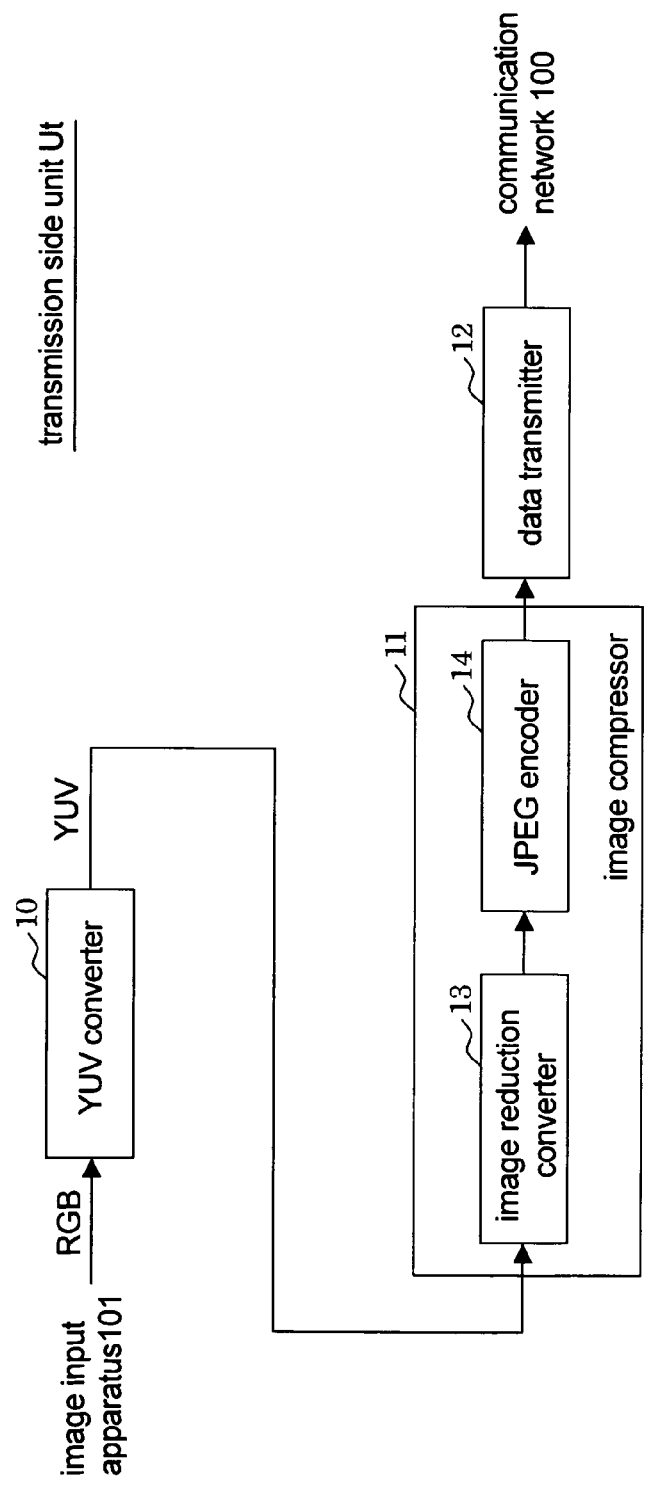

[Fig.3]
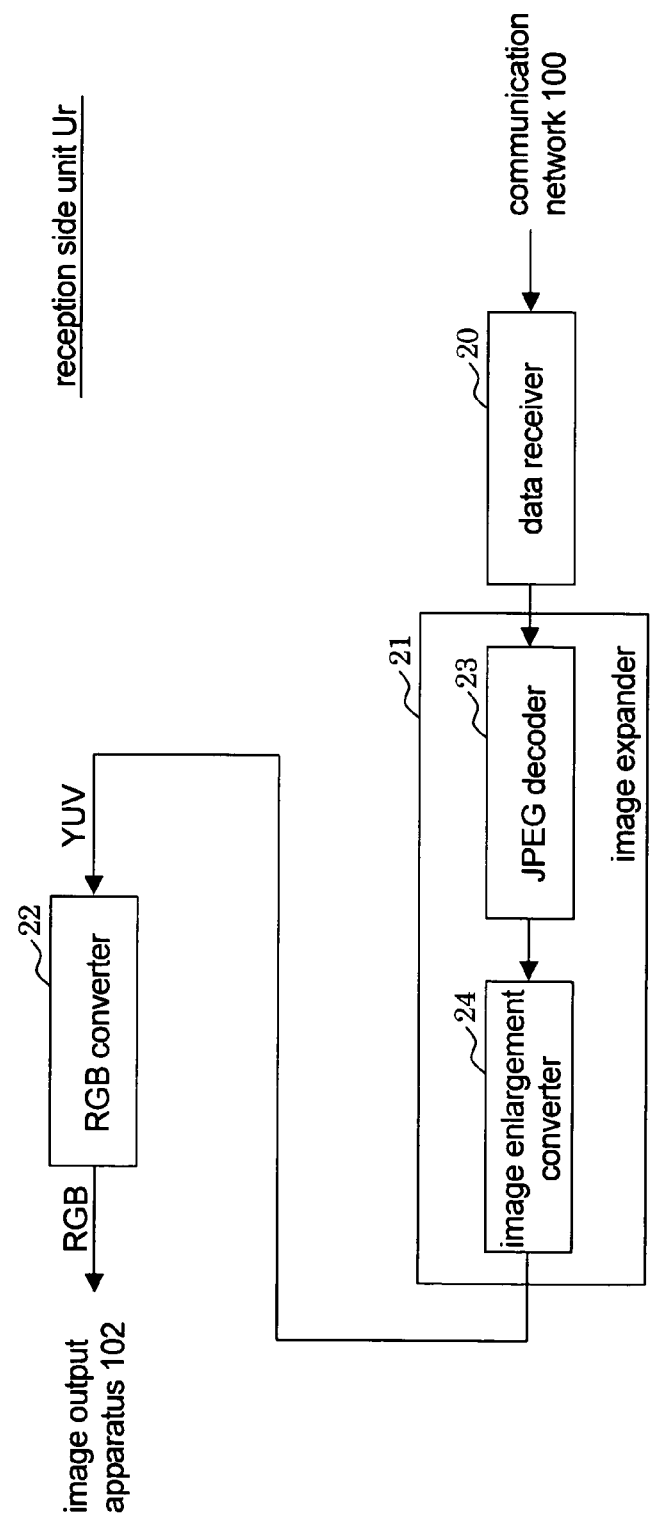

[Fig.4]
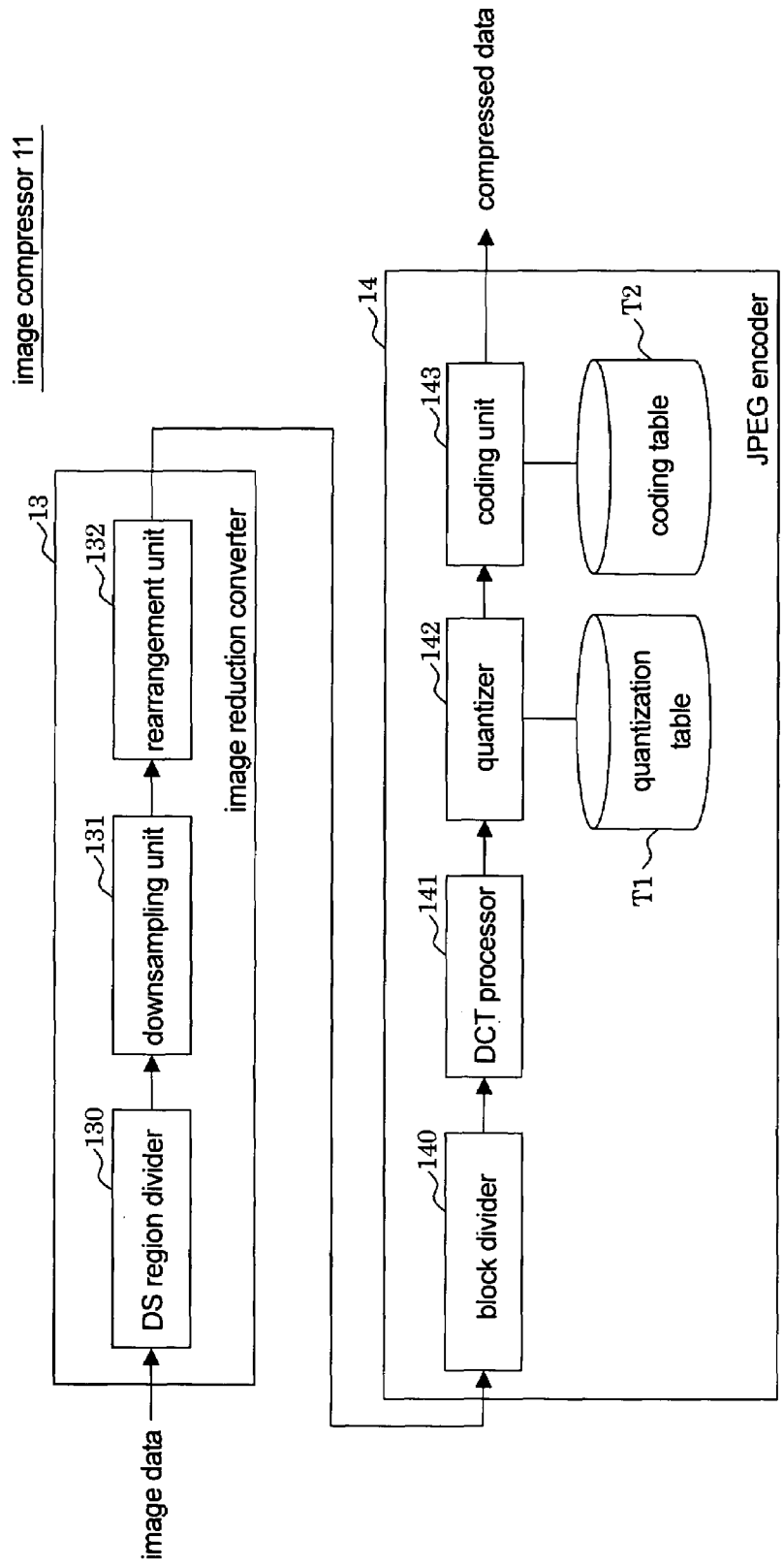

[Fig.5]
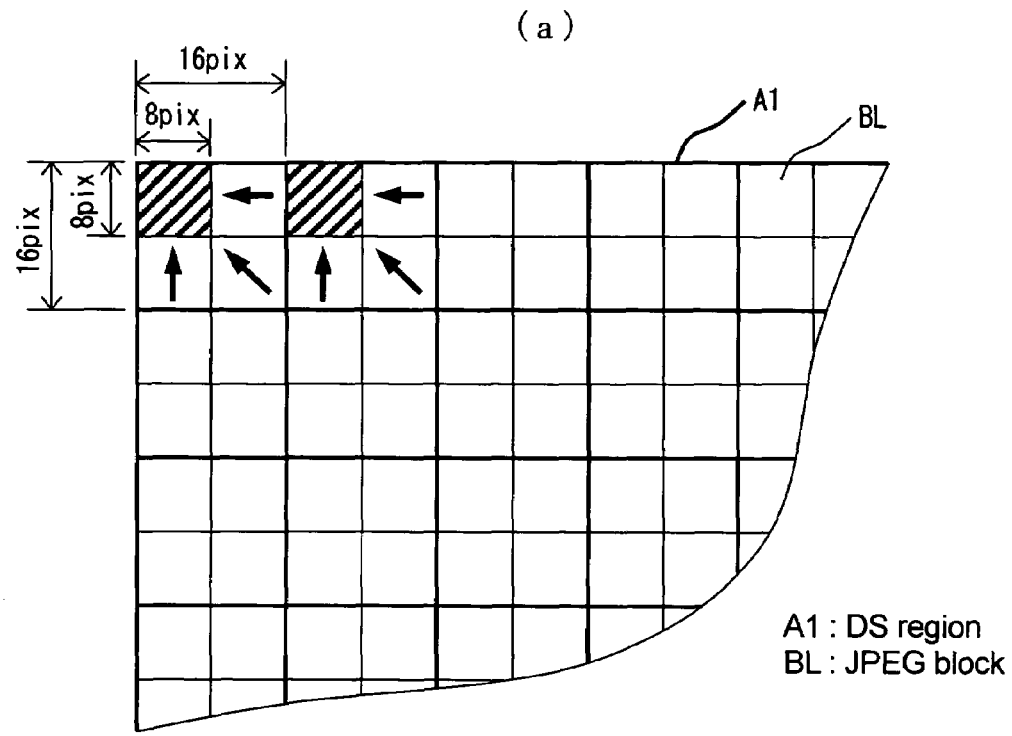
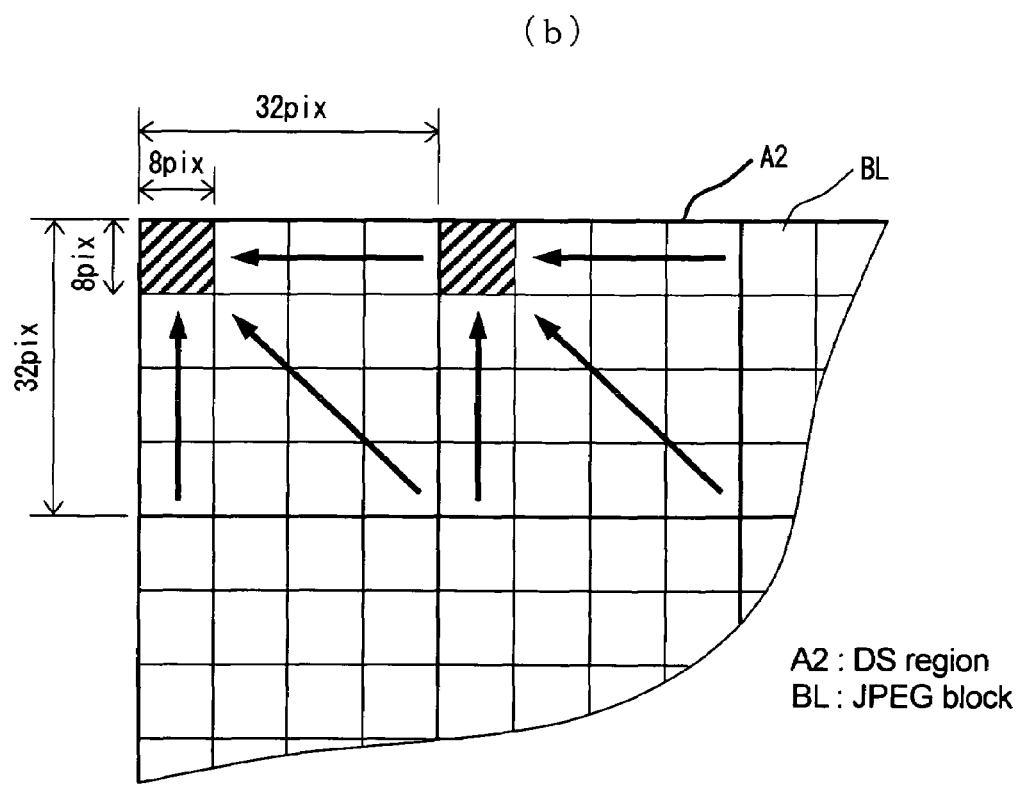

[Fig.6]
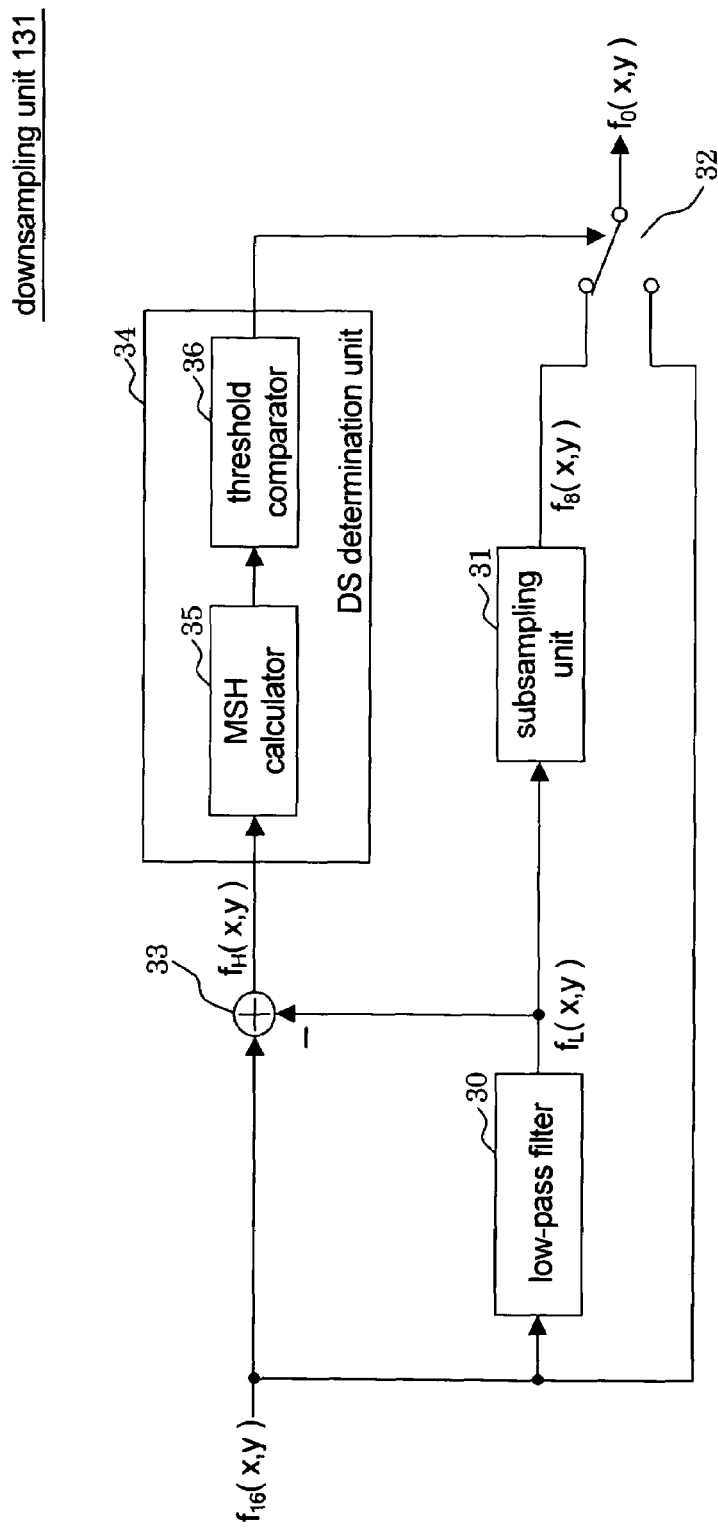

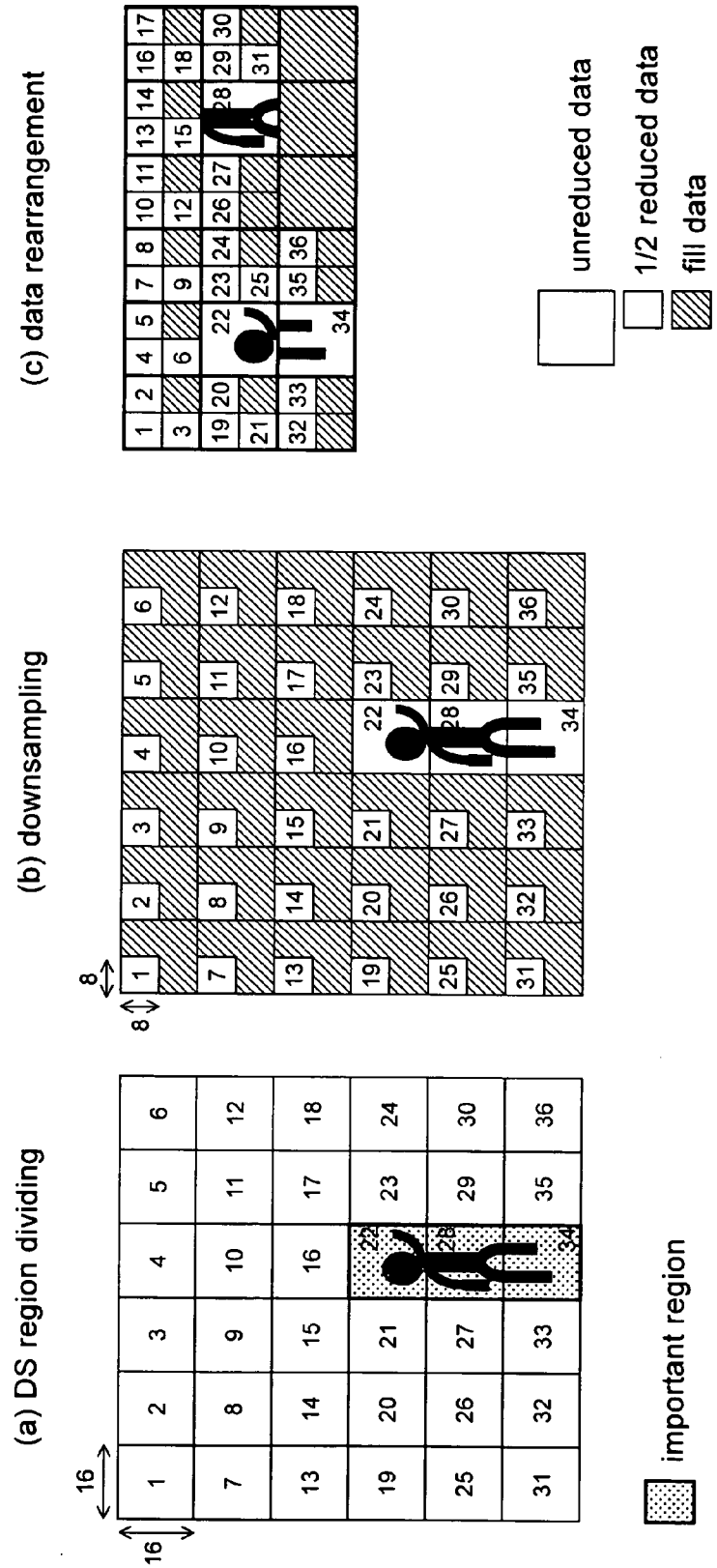

[Fig.8]

(a) quantization table (luminance)

⟶ horizontal frequency

| 16 | 11 | 10 | 16 | 24 | 40 | 51 | 60 |
|----|----|----|----|----|----|----|----|
| 12 | 12 | 14 | 19 | 26 | 58 | 60 | 55 |
| 14 | 13 | 16 | 24 | 40 | 57 | 69 | 56 |
| 14 | 17 | 22 | 29 | 50 | 87 | 80 | 62 |
| 18 | 22 | 37 | 59 | 68 | 109 | 103 | 78 |
| 24 | 35 | 55 | 64 | 81 | 104 | 113 | 92 |
| 49 | 64 | 78 | 87 | 103 | 121 | 119 | 101 |
| 72 | 92 | 95 | 98 | 112 | 100 | 103 | 99 | vertical frequency ↓

(b) quantization table (color-difference)

⟶ horizontal frequency

| 16 | 18 | 24 | 47 | 66 | 99 | 99 | 99 |
|----|----|----|----|----|----|----|----|
| 18 | 21 | 26 | 66 | 99 | 99 | 99 | 99 |
| 24 | 25 | 56 | 99 | 99 | 99 | 99 | 99 |
| 47 | 66 | 98 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 | vertical frequency ↓

[Fig.9]
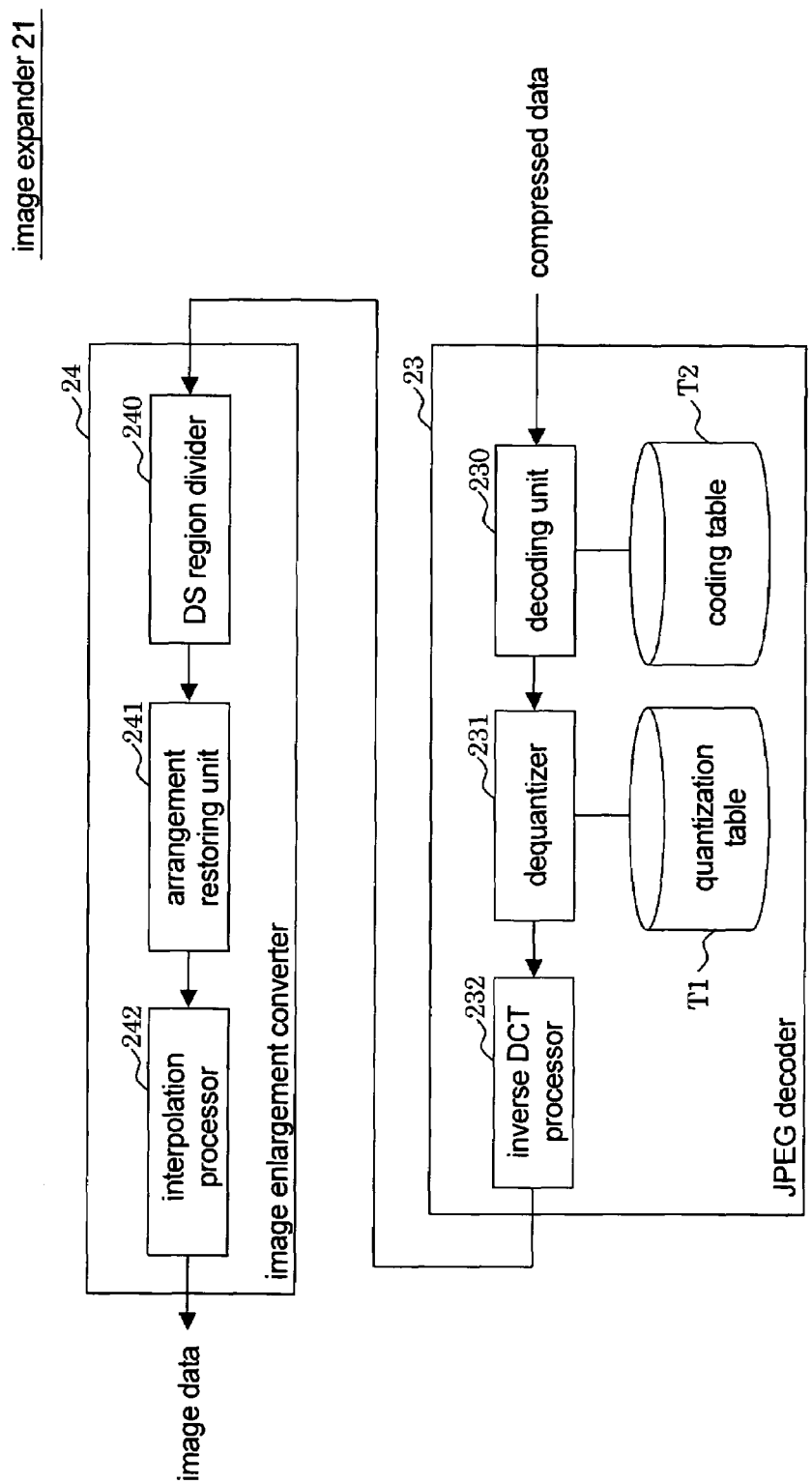

[Fig.10]
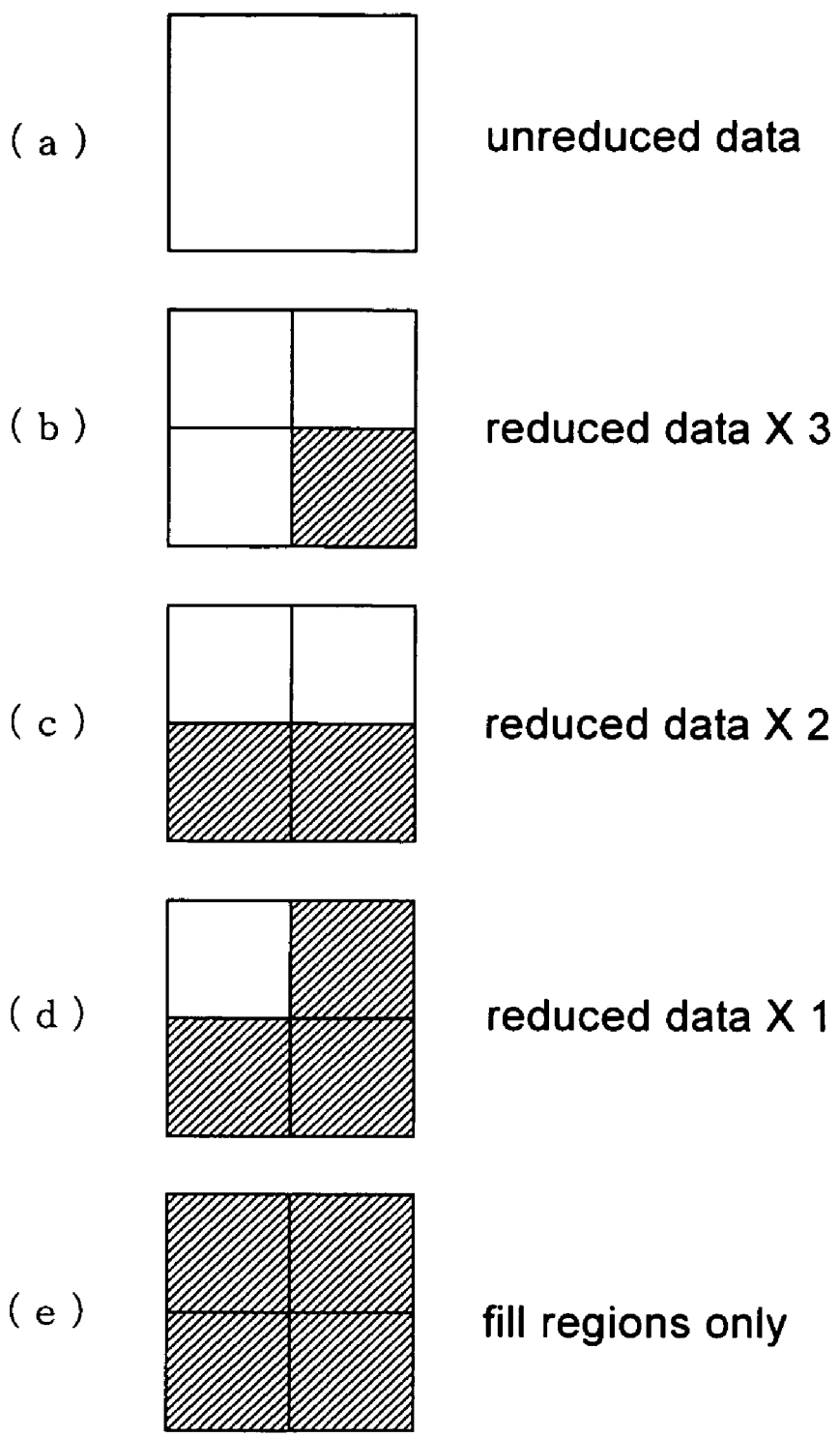

[Fig.11]
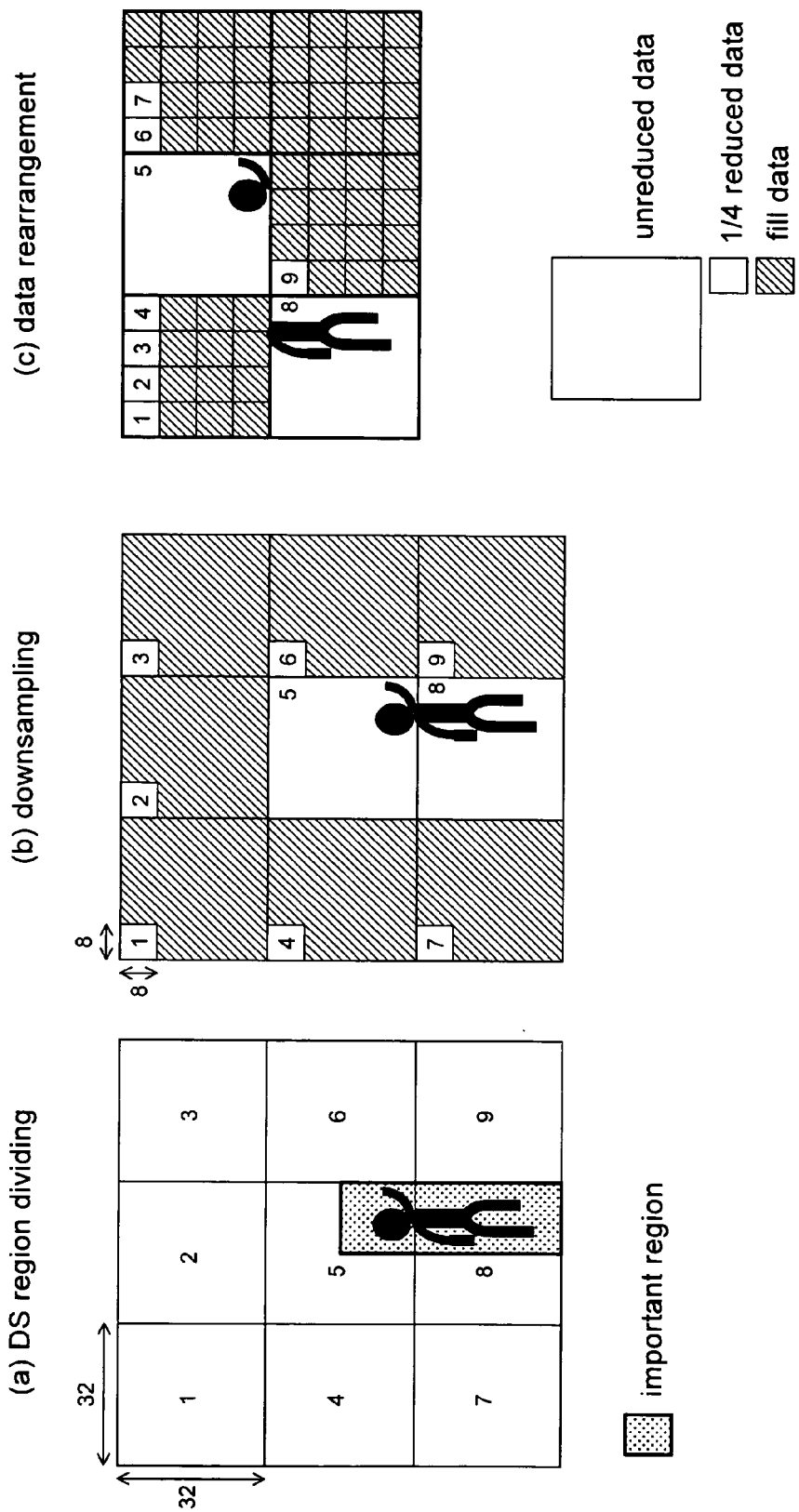

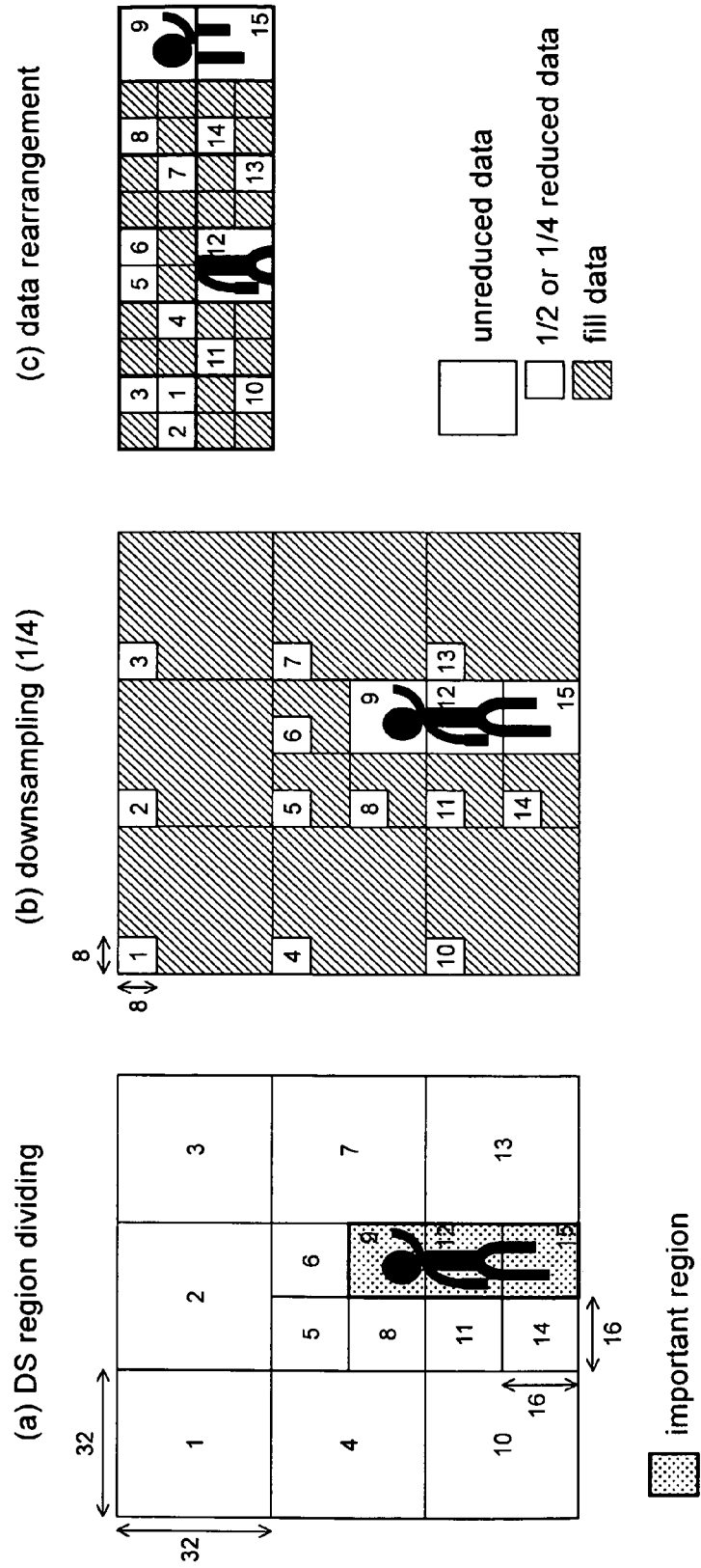

[Fig.13]
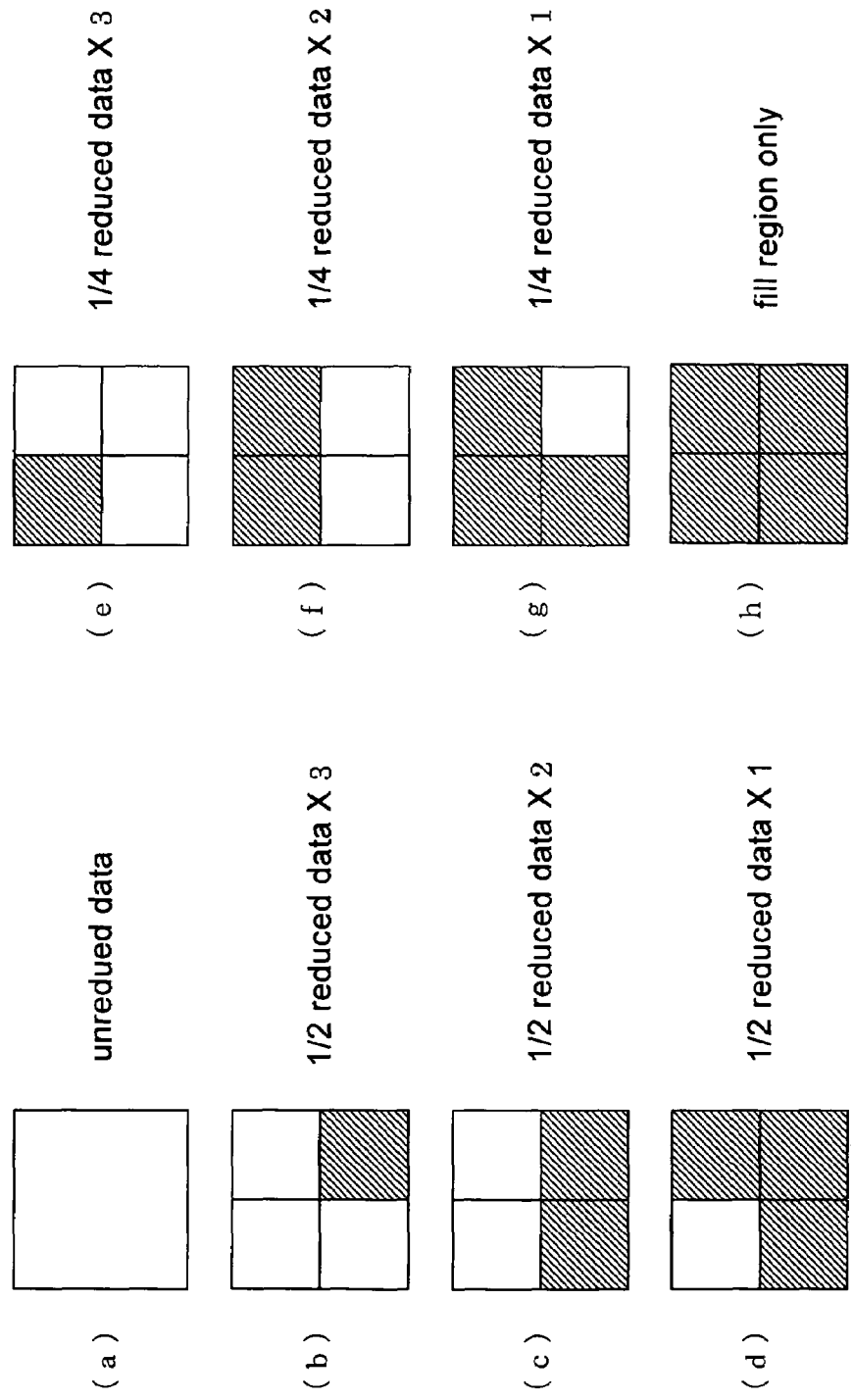

[Fig. 14]
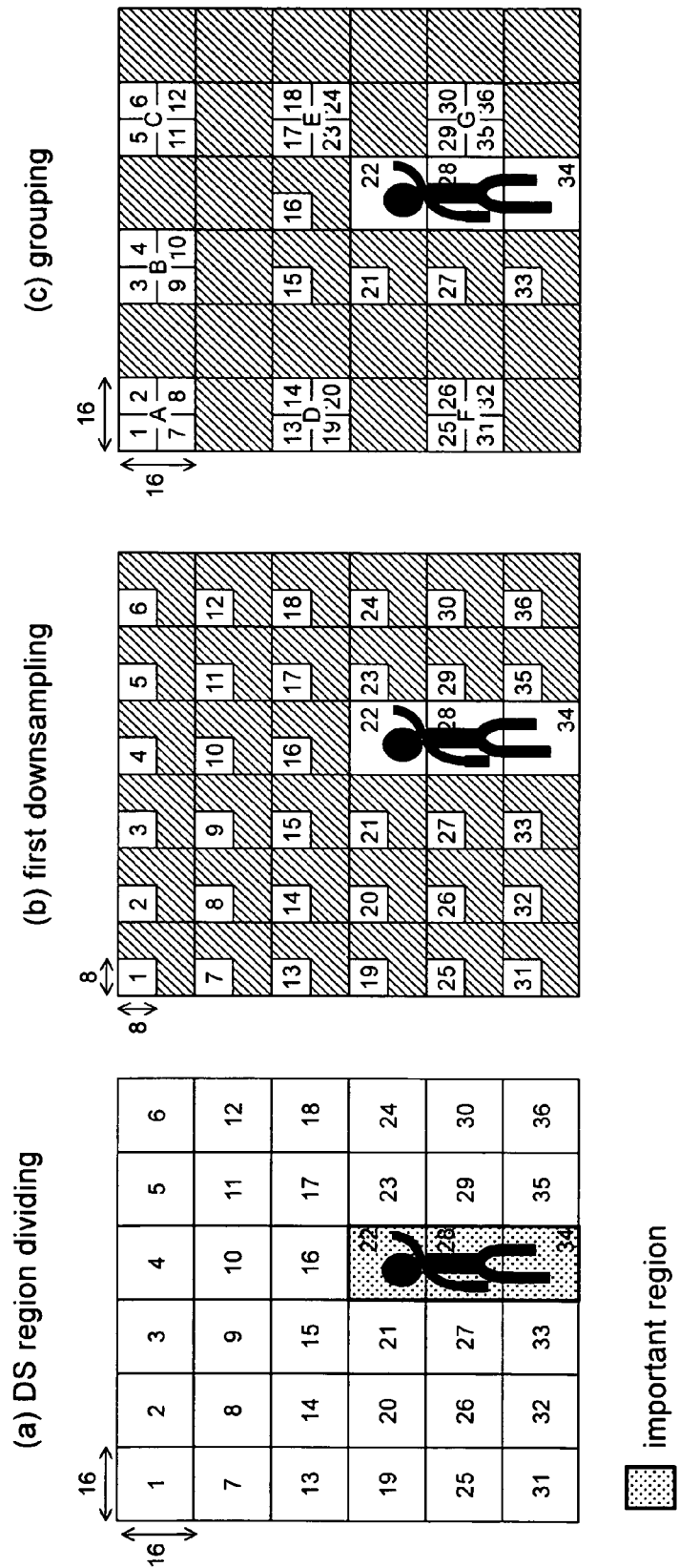

[Fig.15]
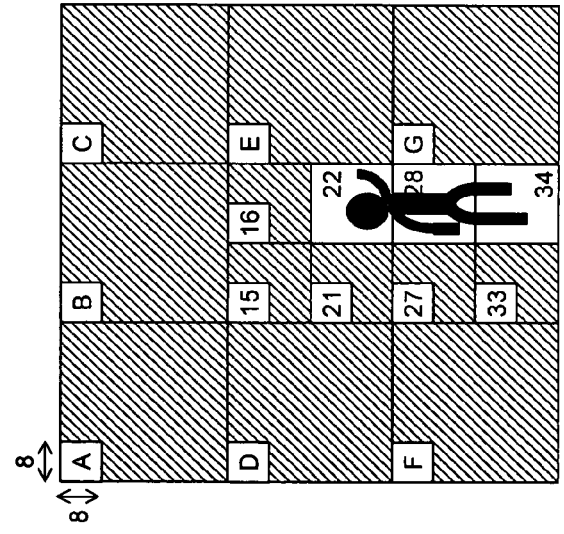
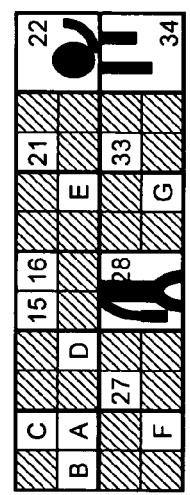
(e) data rearrangement
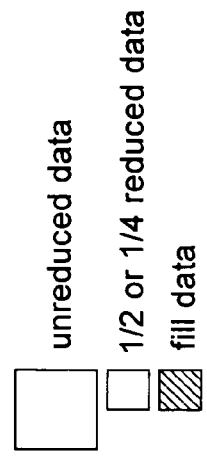
(d) second downsampling

[Fig.16]
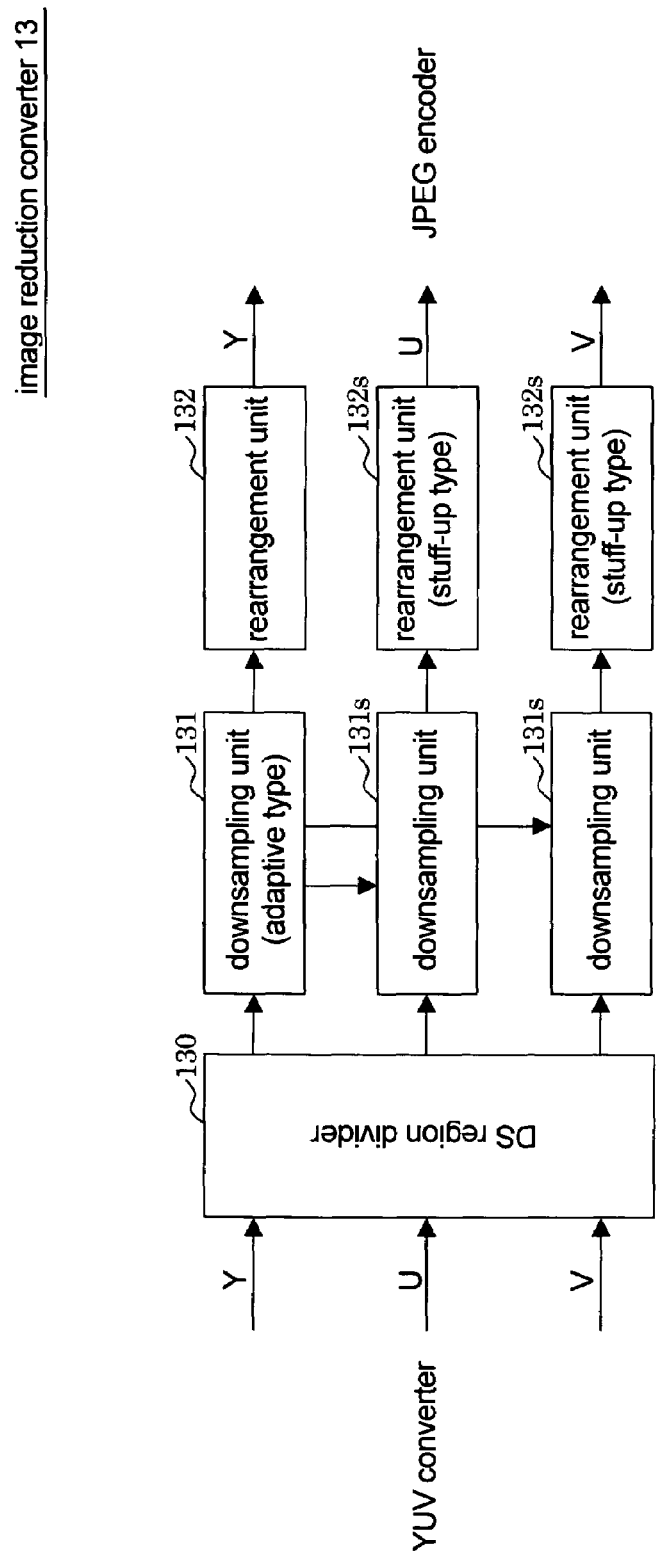

[Fig.17]
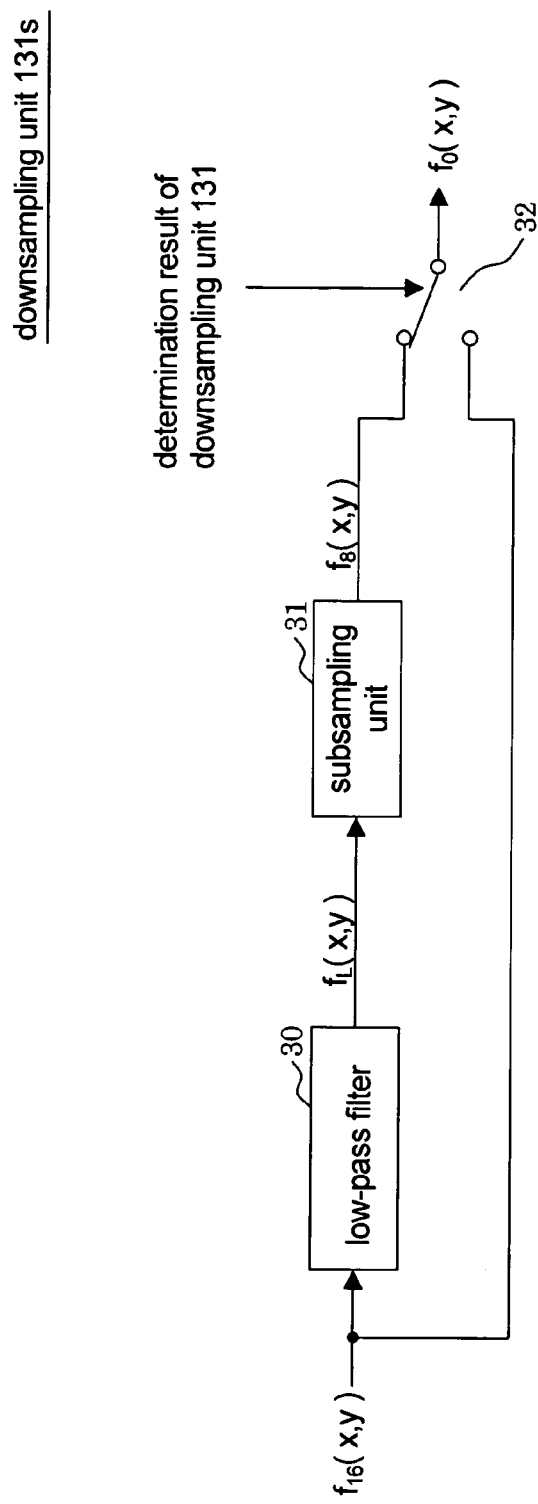

[Fig.18]
(a) luminance data (Y)
|   |   |   |   |   |   |   |   |   |   |   |   |
|---|---|---|---|---|---|---|---|---|---|---|---|
| 1 | 2 | 4 | 5 | 7 | 8 |10 |11 |13 |14 |16 |17 |
| 3 |   | 6 |   | 9 |   |12 |   |15 |   |18 |   |
|19 |20 |   |22 |23 |24 |26 |27 |   |28 |29 |30 |
|21 |   |   |25 |   |   |   |   |   |   |31 |   |
|32 |33 |   |35 |36 |   |   |   |   |   |   |   |
|   |   |34 |   |   |   |   |   |   |   |   |   |
(b) color-difference data (U,V)
|   |   |   |   |   |   |   |   |   |   |
|---|---|---|---|---|---|---|---|---|---|
| 1 | 2 | 5 | 6 | 9 |10 |13 |14 |17 |18 |21 |
| 3 | 4 | 7 | 8 |11 |12 |15 |16 |19 |20 |   |
|   |22 |23 |24 |27 |   |   |28 |29 |30 |33 |
|   |   |25 |26 |   |   |   |   |31 |32 |   |
|   |   |35 |36 |   |   |   |   |   |   |   |
|   |34 |   |   |   |   |   |   |   |   |   |
 unreduced data
 reduced data
 fill data

[Fig. 19]
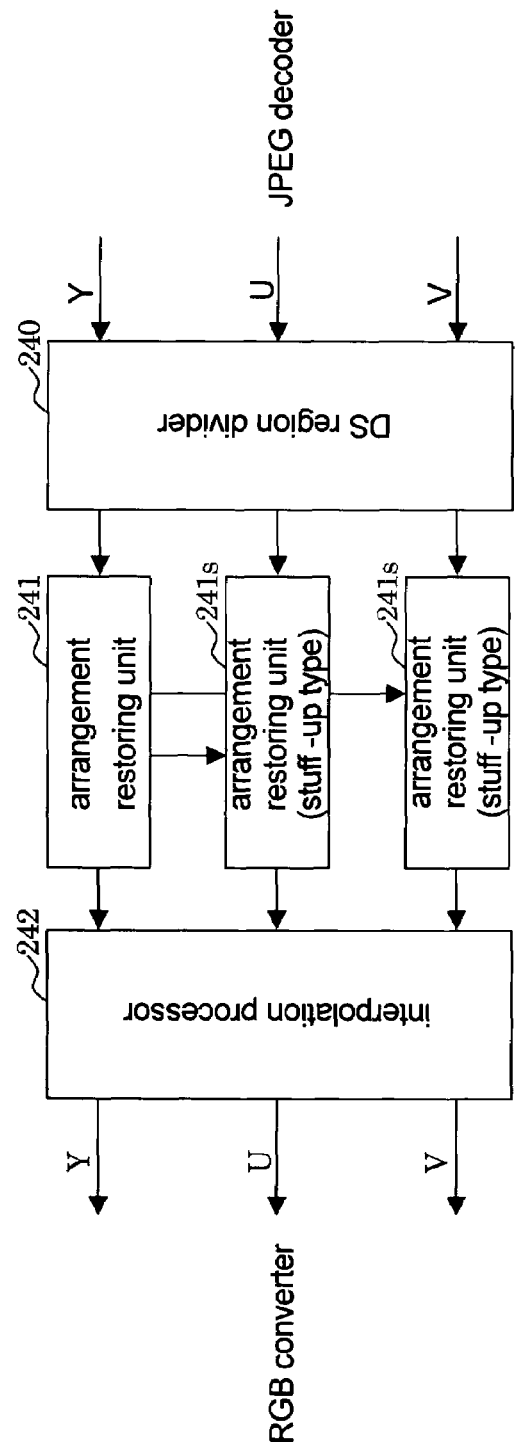

[Fig.20]

[Fig.21]
(a) luminance data (Y)
(b) color-difference data (U,V)
 unreduced data
 1/2 reduced data
 fill data

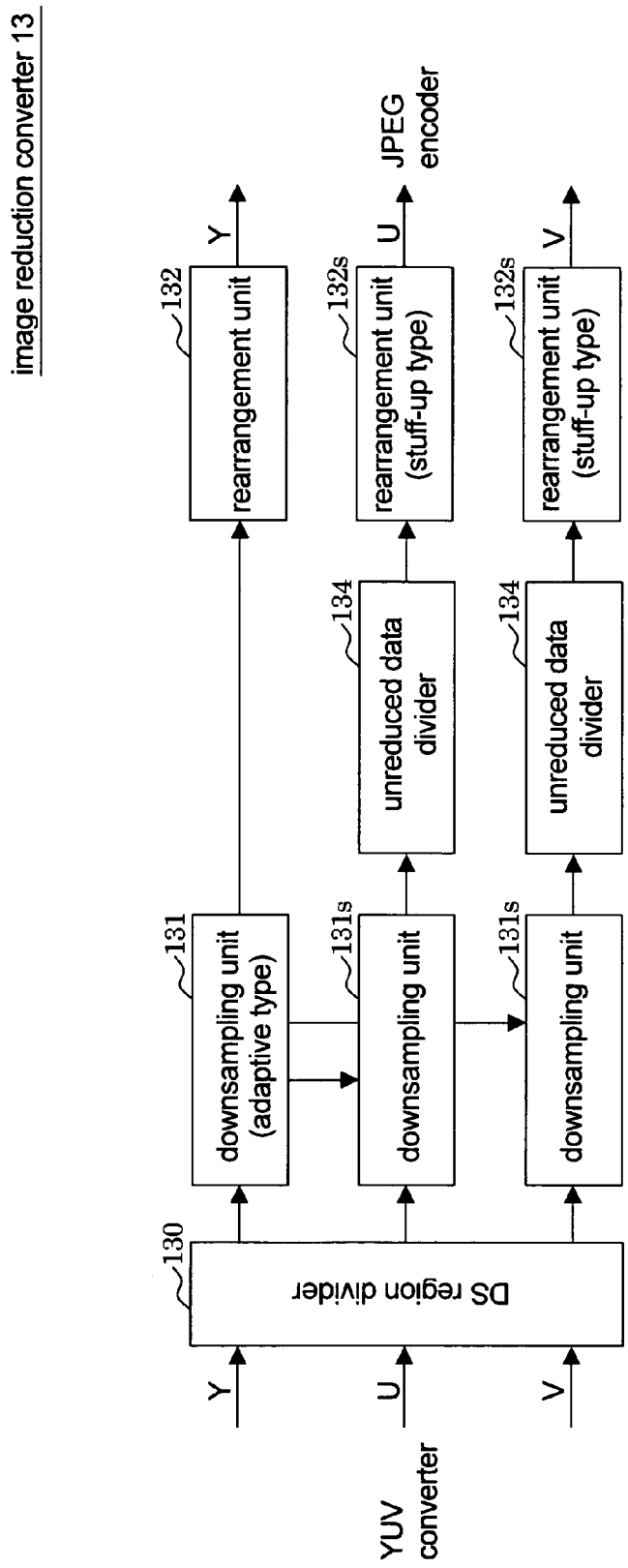
[Fig.22]

[Fig.23]

color-difference data in 422 format (a) DS region dividing (b) downsampling (c) unreduced data dividing

[Fig.24]

(a) luminance data (Y)

(b) color-difference data unreduced data

1/2 reduced data fill data

[Fig.25]
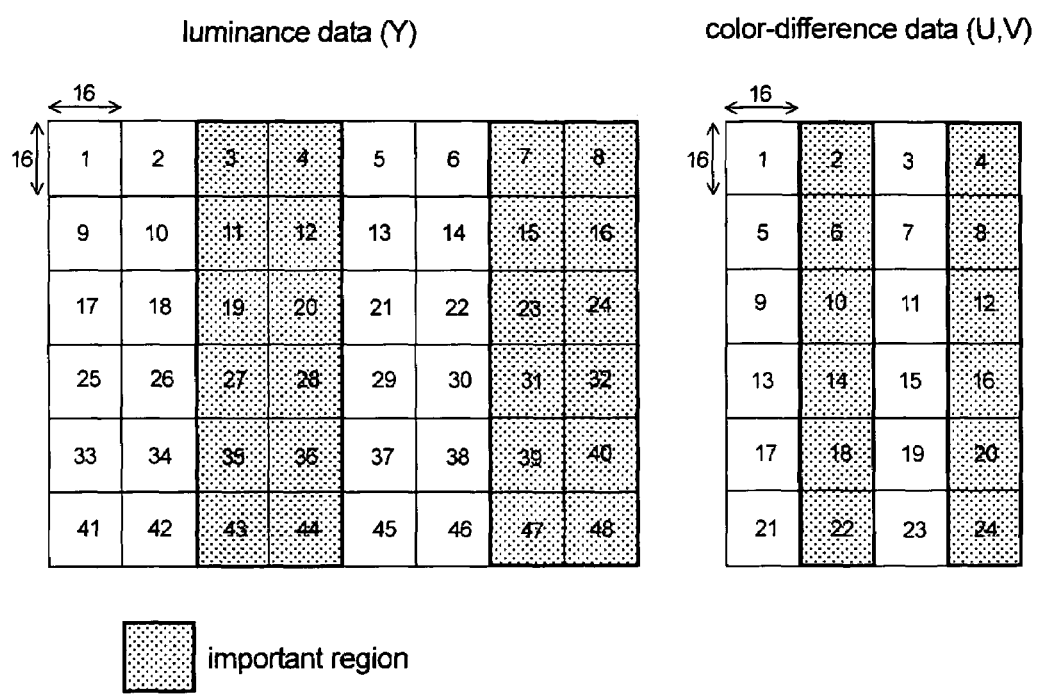

[Fig.26]

(a) compressed image data (6th embodiment)

luminance data (Y)

color-difference data (U,V)

(b) compressed image data (7th embodiment)

luminance data (Y)

color-difference data (U,V)

IMAGE COMPRESSION APPARATUS

This application is a 371 of PCT/JP05/02259 filed Feb. 15, 2005.

TECHNICAL FIELD OF THE INVENTION

The present invention relates to an image compressing and/or expanding method, an image compression apparatus, and an image expansion apparatus. More specifically, the present invention relates to an improvement of an image compressing and/or expanding method such as JPEG compressing and/or expanding method for performing orthogonal transform and quantization on image data for every block region obtained by dividing the image data into a plurality of block regions.

BACKGROUND ART

As methods for compressing and/or expanding image data constituted by a still image, there are widely known JPEG (Joint Photographic Expert Group) standards standardized according to CCITT (International Telegraph and Telephone Consultative Committee) and ISO (International Standards Organization). In the JPEG standards, an image data compressing method performed by dividing a frame image into a plurality of blocks in such a way that 8×8 pixels constitute one block, and transforming a spatial coordinate into a frequency coordinate, and an image data expanding method thereof are defined.

A data compressor according to the JPEG standards (hereinafter call "JPEG compressor") divides input image data into many blocks, and performs DCT (Discrete Cosine Transform) processing and quantization processing on each block. In this quantization processing, a value obtained by multiplying data specified for each DCT coefficient by a quantization table by a quantization factor Q is used as a quantization step width. The DCT coefficient obtained by the DCT processing is quantized by the quantization step width, thereby irreversibly reducing a data amount. Thereafter, entropy coding using a run-length processing, a differential processing, a Huffman coding processing or the like is performed, thereby generating compressed image data. This coding is a processing for irreversibly reducing the data amount.

On the other hand, a data expander according to the JPEG standards (hereinafter call "JPEG expander") performs opposite processings to those performed by the JPEG compressor to restore compressed image data to original image data. Namely, input compressed image data is decoded and dequantized using the same quantization table and the same quantization factor Q as those used in the data compression. Thereafter, an inverse DCT processing unit performs an inverse DCT transform to combine the divided blocks, thereby restoring the compressed image data to the original image data.

To improve a data compression rate of the JPEG compressor, it is necessary to change the quantization table or the quantization factor Q so as to make the quantization step width larger. However, if a large data amount is reduced in the quantization processing, which is an irreversible processing, a quality of the restored image data is greatly degraded. In addition, this quality degradation occurs throughout the image. Due to this, even if an important region and an unimportant region are present in the image, the image quality is disadvantageously, uniformly degraded in the both regions.

To solve this problem, there has been proposed a compression processing method for making a quality of an image after restoration different among regions of the image (see, for example, Patent Document 1). The Patent Document 1 discloses a data compression processor that includes a mask circuit that masks a DCT coefficient before a quantization processing. This data compression processor makes a mask employed in the mask circuit different among the regions, thereby coding an image in an important region at a high image quality and coding the image in an unimportant region at a low image quality.

However, this data compression processor needs to perform a mask processing halfway along DCT processing and quantization processing those are performed sequentially. Due to this, a general-purpose JPEG compression processor such as a JPEG chipset can not be employed as this data compression processor and the data compression processor is disadvantageously made expensive. Furthermore, the mask processing is a processing performed in each block, so that there is a limit to a data amount that can be reduced.

Patent Document 1: Japanese Unexamined Patent Publication No. 1994-054310

DISCLOSURE OF THE INVENTION

Problems to be Solved by the Invention

To solve the above-stated problems, the inventors of the present application filed a prior patent application (identified by Japanese Patent Application No. 2003-43367). This prior application discloses a technique for dividing image data into a plurality of small regions and for performing downsampling processing on a part of the small regions as a preprocessing to JPEG compression processing. This downsampling is a processing for reducing image data in the divided small region by downsampling, making the reduced image data coincident with the block, and inserting fill data into a remaining part of the region. By using this method, it is possible to reduce the data amount while making the quality of the image different among the regions by using the general-purpose JPEG compression processor.

The present invention has been achieved in view of these circumstances. It is an object of the present invention to improve a data compression rate of an image compression apparatus using the downsampling processing. It is also an object of the present invention to improve a data compression rate of an image compression apparatus that can use a general-purpose data compressor and a general-purpose data expander and that reduces a data amount while making a quality of an image different among regions. It is particularly an object of the present invention to realize a high compression rate using a JPEG compressor and a JPEG expander.

Means for Solving the Problems

An image compression apparatus according to a first aspect of the present invention includes downsampling means, rearranging means, and data compressing means. The downsampling means divides image data into a plurality of downsampling regions each at a size that is an integer multiple of a block size. The downsampling means performs downsampling on at least a part of said downsampling regions to decrease the number of pixels thereof, and generates reduced data each at a size that is an integer multiple of said block size. The rearranging means arranges two or more pieces of said reduced data in each of downsampling regions subjected to said downsampling, inserts fill data into each of pixels left in said downsampling region in which said reduced data is arranged, and removes the downsampling regions in which the reduced data is not arranged. The data compressing means divides image data generated by the rearranging means into a plurality of block regions each at said block size, and performs a compression processing including an orthogonal transform and a quantization on each of said block regions, thereby generating compressed image data. With this constitution, downsampling and rearrangement may are performed for a part of the image region, thereby the image data can be spatially compressed as a preprocessing to a data compressing step.

Further, said downsampling region dividing means divides said image data into said downsampling regions having different sizes, and said downsampling means performs said downsampling at different reduction rates according to the sizes of said downsampling regions, thereby generates said reduced data equal in size. With this constitution, a combination of downsamplings at different reduction rates can be used, and a data compression rate can be improved.

In an image compression apparatus according to a second aspect of the present invention, the downsampling means performs downsampling on at least a part of said downsampling regions to generate said reduced data, collects said reduced data to generate a new downsampling region, performs the downsampling again on the new downsampling region, thereby generates new reduced data each at a size that is an integer multiple of said block size. With this constitution, a combination of downsamplings at different reduction rates can be used.

An image compression apparatus according to a third aspect of the present invention performs a compression processing on image data that consists of luminance data and color-difference data. The image compression apparatus includes downsampling region dividing means, luminance downsampling means, luminance data rearranging means, color-difference downsampling means, color-difference data rearranging means, and data compressing means. The downsampling region dividing means divides said luminance data that constitutes the image data into luminance downsampling regions each at a size that is an integer multiple of a block size, and divides the color-difference data that constitutes the image data into color-difference downsampling regions each at a size that is the integer multiple of said block size.

The luminance data divided into the luminance downsampling regions is processed by the luminance downsampling means and the luminance data rearranging means. The luminance downsampling means performs downsampling on at least a part of said luminance downsampling regions to decrease the number of of said luminance data, and generates reduced luminance data each at a size that is an integer multiple of said block size. The luminance data rearranging means arranges two or more pieces of said reduced luminance data in each of luminance downsampling regions subjected to said luminance downsampling, and inserts fill data into each of pixels left in said luminance downsampling region in which said reduced luminance data is arranged. During rearranging, the luminance data rearranging means arranges the reduced luminance data in the luminance downsampling regions so as to leave a discrimination region having said block size at a predetermined position in each of said luminance downsampling regions.

On the other hand, the color-difference data divided into the color-difference downsampling regions is processed by the color-difference sampling means and the color-difference data rearranging means. The color-difference downsampling means performs downsampling on said color-difference downsampling regions determined based on said luminance downsampling regions subjected to said luminance downsampling to decrease the number of said color-difference data, and generates reduced color-difference data each at a size that is the integer multiple of said block size. The color-difference data rearranging means arranges two or more pieces of said reduced color-difference data in each of said color-difference downsampling regions.

With this constitution, it is unnecessary to put the discrimination region in each of the color-difference downsampling regions in which the reduced color-difference data is rearranged, therefore, it is possible to improve compression efficiency for compressing the image data that consists of the luminance data and the color-difference data.

An image compression apparatus according to a fourth aspect of the present invention, in addition to the third aspect of the present invention, further includes color-difference data dividing means for dividing each of said color-difference downsampling regions that are not subjected to said color-difference downsampling into regions each at a size equal to said reduced color-difference data, thereby generating divided color-difference data. In addition, said color-difference data rearranging means is constituted to rearrange said reduced color-difference data and the divided color-difference data.

With this constitution, not only the reduced data but also the unreduced data can be rearranged with respect to the color-difference data, therefore, it is possible to further improve the compression efficiency for compressing the image data that consists of the luminance data and the color-difference data.

Effect of the Invention

According to the present invention, it is possible to improve the data compression rate of the image compression apparatus using the downsampling processing. In addition, it is possible to improve the data compression rate of the image compression apparatus that can use a general-purpose data compressor and a general-purpose data expander and that reduces the data amount while making a quality of an image different among regions. It is particularly possible to realize a high compression rate using the JPEG compressor and the JPEG expander.

BEST MODE FOR CARRYING OUT THE INVENTION

First Embodiment

<Image Transmission System>

FIG. 1 is a block diagram of an example of a configuration of an image compression and expansion system according to the first embodiment of the present invention and shows an example of an image transmission system. This image transmission system includes a transmission side unit Ut and a reception side unit Ur connected to each other by a communication network 100 and can compress image data and transmit the compressed image data from the transmission side unit Ut to the reception side unit Ur. In this embodiment, image data of an image input apparatus 101 connected to the transmission side unit Ut is transmitted to an image output apparatus 102 connected to the reception side unit Ur.

The communication network 100, which is constituted by a wired or wireless communication line for transmitting digital data, includes an exchange unit and/or a repeater unit if it is necessary to do so. For example, a packet communication network such as Ethernet®, the Internet or ATM (Asynchronous Transfer Mode) network, or the other digital network can be used as the communication network 100.

The image input apparatus 101, which is an apparatus that provides image data, includes, for example, an imaging device such as a camera, an image reader such as a scanner, and a data storage device such as a HDD (Hard Disc Drive). In the present embodiment, the image input apparatus 101 is assumed to generate image data of a still image in an RGB format and to output the generated image data to the transmission side unit Ut. In the present specification, the still image means an image constituted by many pixels arranged two-dimensionally, and examples of the still image include a frame image of each frame and a differential image between frames that constitutes a moving image.

The image output apparatus 102, which is an apparatus that uses the image data output from the reception side unit Ur, includes, for example, a display device such as an LCD, an image forming device such as a printer, and a data storage device such as the HDD (Hard Disc Drive).

<Transmission Side Unit>

FIG. 2 is a block diagram of an example of a configuration of the transmission side unit Ut shown in FIG. 1. This transmission side unit Ut includes a YUV converter 10, an image compressor 11, and a data transmitter 12. The image data generated by the image input apparatus 101 is converted first into image data in a YUV format in the YUV converter 10. The resultant image data in the YUV format is compressed by the image compressor 11 into compressed data having a reduced data amount. This compressed data is transmitted to the communication network 100 by the data transmitter 12.

The YUV converter 10 is format converting means for converting the image data in the RGB format into the image data in the predetermined YUV format (e.g., YUV410, 411, 420, 422 or 444). If the image data in the YUV format is input from the image input apparatus 101 or JPEG compression is performed on the image data in the RGB format, the YUV converter 10 may be omitted.

The image compression unit 11 includes the image reduction converter 13 and the JPEG encoder 14. The image reduction converter 13 divides an input image into many small regions, reduces a resolution at least for part of the small regions, and rearranges these small regions, thereby reducing a size of the entire image. This resolution reduction is performed for small region by small region according to a image quality required for each region. The JPEG encoder 14 subjects the image data to a compression processing according to the JPEG standards ("JPEG compression processing"), and generates the compressed data having a further reduced data amount.

<Reception Side Unit>

FIG. 3 is a block diagram of an example of a configuration of the reception side unit Ur shown in FIG. 1. This reception side unit Ur includes an RGB converter 22, an image expander 21, and a data receiver 20. The compressed data transmitted from the transmission side unit Ut to the communication network 100 is received by the data receiver 20. The received compressed data is expanded by the image expander 21 and restored to the image data in the YUV format. This image data is converted into image data in the RGB format by the RGB converter 22 and the image data in the RGB format is output to the image output apparatus 102.

The image expander 21 includes a JPEG decoder 23 and an image enlargement converter 24. The compressed data from the data receiver 20 is subjected to an expansion processing according to the JPEG standards ("JPEG expansion processing") by the JPEG decoder 23, and restored to the image data before the JPEG compression. An image size of the image data thus expanded is increased by the rearrangement and the resolution improvement by the image enlargement converter 24, whereby the image data is restored to image data before the resolution is reduced.

The RGB converter 22 converts the image data in the YUV format output from the image enlargement converter 24 into the image data in the RGB format, and outputs the image data in the RGB format to the image output apparatus 102. If the image data in the YUV format is input to the image output apparatus 102 or the image data in the RGB format is subjected to the JPEG compression, the RGB converter 22 is omitted.

<Image Compressor>

FIG. 4 is a block diagram of an example of a configuration of the image compressor 11 shown in FIG. 2. FIG. 4 shows an example of detailed configurations of the image reduction converter 13 and the JPEG encoder 14. The image reduction converter 13 includes a downsampling region divider ("DS region divider") 130, a downsampling unit 131, and a rearrangement unit 132.

[DS Region Divider]

The DS region divider 130 divides the image data in the YUV format converted from the RGB format into a plurality of DS regions. Each DS region includes an arbitrary number of pixels and can be set as a region in an arbitrary shape. However, considering compression efficiency, it is preferable that a block used in the JPEG encoder 14 is set as a basic unit and that each DS region is a group of such blocks.

Since a size of a JPEG block is 8×8 pixels, a size of a DS region, which is an integer multiple of the JPEG block, may be 16×16 pixels, 32×32 pixels, 24×16 pixels, 8×32 pixels or the like. However, if a block size discrimination region, to be described later, is inserted into each DS region, it is necessary to set the DS region size three times or more as large in area as the block size so as to reduce the entire image regions by the rearrangement.

Furthermore, the DS regions may be different in size or different in shape. However, in views of facilitating a rearrangement processing, to be described later, the DS regions are preferably equal in size and in shape and more preferably, the DS regions are rectangular (particularly square). In the present embodiment, an instance of dividing the entire image into a plurality of DS regions equal in size, i.e., each having a size of 16×16 pixels will be described.

[Downsampling Unit]

The downsampling unit 131 performs downsampling on each pixel data that constitutes each DS region for at least one part of the DS regions, and converts the image data into reduced data having reduced number of pixels. It is preferable that a size of this reduced data is an integer multiple of the block size in view of the compression rate of the JPEG encoder, and in this embodiment, the reduced data size is made coincident with the block size (8×8 pixels).

The DS regions subjected to the downsampling processing are determined according to the image quality required for each DS region. For instance, if the entire image regions include important regions required to have a high image quality and unimportant regions that are not required to have the high image quality, the downsampling processing is performed only on the unimportant DS regions. For instance, for the important DS region, the input data (unreduced data) is output without processing it. For the unimportant DS region, the reduced data obtained by the downsampling processing is output.

Discrimination as to whether the region is the important region or the unimportant region, that is, discrimination as to whether the DS region is a DS region subjected to the downsampling is determined in advance or designated by an operator. Alternatively, whether the region is the important region or the unimportant region may be automatically discriminated based on an output signal of a sensor (not shown) or based on the image data. For instance, a region including a motion can be discriminated as the important region based on a result of a comparison among the frames of the moving image. In addition, a flat image region having relatively small change can be discriminated as the unimportant region.

The downsampling processing is realized by a subsampling processing for thinning pixels in each DS region, a filter processing using a low-pass filter and the like. The downsampling processing may be realized only by the subsampling processing. However, a highly accurate downsampling processing with fewer distortions can be realized by a combination of the filter processing and the subsampling processing. For instance, in a processing using a Gaussian filter as the low-pass filter, a one-dimensional Gaussian filter is applied to a horizontal direction of the image data and then the same filter is applied to a vertical direction of obtained data. The image data subjected to the filter processing by the Gaussian filter is subjected to the subsampling processing, whereby highly accurate downsampling can be performed.

FIGS. 5(a) and 5(b) show examples of a DS region division and a downsampling performed by the image compressor 11. FIG. 5(a) shows an instance in which the entire image is divided into DS regions A1 each having a size of 16×16 pixels. In FIG. 5(a), symbol BL denotes a JPEG block having a size of 8×8 pixels. The DS region divider 130 coincides a reference position for the division (upper left position of a screen in FIG. 5(a)) with that for JPEG block division so that the DS region A1 is a group of the blocks BL. The downsampling unit 131 performs downsampling on the DS region A1, which is the unimportant region, so that the number of pixels of the DS region A1 is reduce to ½ both vertically and horizontally and converted into reduced data having a size of 8×8 pixels. Likewise, FIG. 5(b) shows an instance of dividing the entire image into DS regions A2 each having a size of 32×32 pixels. Each DS region A2, which is the unimportant region and which is divided by the DS region divider 130, is converted into reduced data having a size of 8×8 pixels by downsampling the DS region A2 to reduce the number of pixels of the DS region A2 to ¼ both vertically and horizontally by the downsampling unit 131.

FIG. 6 is a block diagram of an example of a detailed configuration of the downsampling unit 131. This downsampling unit 131 is an adaptive downsampling unit that performs downsampling based on each pixel data in the DS region, and reduces a resolution of each DS region constituted by a flat image while maintaining a high quality of each DS region including a profile or a fine change, thereby reducing the data amount.

This adaptive downsampling unit includes a low-pass filter 30, a subsampling unit 31, an output selector 32, a subtracter 33, and a downsampling determination unit ("DS determination unit") 34. Pixel data $f_{16}(x, y)$ at a size of 16×16 pixels that constitutes each DS region is input to the adaptive downsampling unit. The pixel data $f_{16}(x, y)$ is either luminance data Y or color-difference data U and V in a coordinate (x, y) of each DS region.

The low-pass filter 30 removes a high frequency component of the input pixel data $f_{16}(x, y)$, thereby providing pixel data $f_L(x, y)$ consisting of a low frequency component. This pixel data $f_L(x, y)$ is further subjected to subsampling for every other pixel by the subsampling unit 31, thereby providing pixel data $f_8(x, y)$ having the size of 8×8 pixels and represented by the following equation.

$$f_8(x,y)=f_L(2x,2y) \text{ for } x,y=0,1,2,\ldots,7 \quad (1)$$

Namely, the low-pass filter 30 and the subsampling unit 31 perform the downsampling processing to generate the reduced data. The output selector 32 selects one of the pixel data $f_{16}(x,y)$, which is unreduced data, and the pixel data $f_8(x, y)$, which is reduced data, and outputs the selected pixel data to the rearrangement unit 132 as output pixel data $f_o(x, y)$.

The DS determination unit 34 determines whether to perform the downsampling based on the high frequency component contained in each DS region, and switching-controls the output selector 32 based on this determination result. This DS determination unit 34 includes an MSH (Means Square High Frequency Component) calculator 35 and a threshold comparator 36. Pixel data $f_H(x, y)$ consisting of the high frequency component and obtained by the subtracter 33 is input to the DS determination unit 34. The MSH calculator 35 calculates a square sum (MSH) of the pixel data $f_H(x, y)$ according to the following equation.

$$MSH = \frac{1}{16 \times 16} \sum_{x=0}^{15} \sum_{y=0}^{15} \{f_H(x, y)\}^2 \quad (2)$$

$$f_H(x, y) = f_{16}(x, y) - f_L(x, y) \quad (3)$$

The threshold comparator 36 compares the MSH obtained as represented by the above equation with a predetermined determination threshold Th. If the MSH is lower than the determination threshold Th, the threshold comparator 36 outputs the downsampled pixel data $f_8(x, y)$ to the output selector 32, and if the MSH is equal to or higher than the determination threshold Th, the threshold comparator 36 outputs the input pixel data $f_{16}(x, y)$ to the output selector 32 without processing it.

$$f_o(x, y) = \begin{cases} f_8(x, y) & \text{if } MSH < Th \\ f_{16}(x, y) & \text{otherwise} \end{cases} \quad (4)$$

[Rearrangement Unit]

The rearrangement unit 132 rearranges the output data of the downsampling unit 131, generates the image data on the image the entire size of which is reduced, and outputs the image data to the JPEG encoder 14. The data output from the downsampling unit 131 includes a mixture of unreduced data each at the size of 16×16 pixels and reduced data each at the size of 8×8 pixels. Due to this, if two or more pieces of reduced data are collected and rearranged in the same DS region, then the number of DS regions can be decreased, and the size of the entire image can be thereby reduced.

If the downsampling unit 131 performs the downsampling on continuous DS regions and continuously outputs reduced data, the rearrangement unit 132 sequentially arranges these pieces of reduced data in the same DS region. If pieces of reduced data are not continuous or the number of continuous pieces of reduced data is small, then the rearrangement unit 132 arranges the reduced data in the same DS region and then inserts fill data into a remaining part of the DS region. The fill data is arbitrary data at a size of a pixel. A region into which the fill data has been inserted will be referred to as "fill region".

In the DS region in which the pieces of reduced data are arranged, the fill region consisting of 8×8 pixels is always provided besides above mentioned the blank region. This fill region is a discrimination region that enables discrimination as to whether the DS region is a region in which pieces of the reduced data have been arranged, and a position of this fill region is set in the DS region in advance. Since an arrangement order of the reduced data in the DS region is set in advance and each blank region is set as the fill region, the reception side unit Ur can restore arrangement of the reduced data to that of the original data based on the fill data. Therefore, it is unnecessary to separately transmit information on the arrangement of the reduced data from the transmission side unit Ut to the reception side unit Ur.

Furthermore, providing the blank region and the discrimination region as the fill regions into which the same data has been inserted, the compression rate at which the JPEG encoder 14 performs a compression processing can be improved.

It is noted that the JPEG encoder 14 can not process image data of a shape other than the rectangular shape. Due to this, the rearrangement unit 132 adds one or more DS regions consisting only of fill data to an end of the image data in which DS regions are eliminated, thereby reshaping the image data into rectangular image data.

FIGS. 7(a) to 7(c) show an example of an operation performed by the image reduction converter 13. It is assumed that each of the processings performed by the DS region divider 130, the downsampling unit 131, and the rearrangement unit 132 is started at the upper left position of the image data and sequentially moved from left to right in a horizontal direction. It is also assumed that if the processing is completed up to a right end of the image data, then a processing target is shifted in a downward direction, and the same processing is repeatedly performed on a region located right under the processed region.

FIG. 7(a) shows a DS region dividing state. The DS region divider 130 divides the image data input from the image input apparatus 101 and having a size of 96×96 pixels into 36 DS regions (#1 to #36) each at a size of 16×16 pixels, and sequentially outputs image data of the respective DS regions to the downsampling unit 131. Among this, DS regions #22, #28, and #34 are assumed as the important regions and the other DS regions are assumed as the unimportant regions.

FIG. 7(b) shows a downsampling state. The downsampling unit 131 determines whether each of the DS regions sequentially output from the DS region divider 130 is the important region or the unimportant region. If determining that a certain DS region is the important region, the downsampling is not performed and pixel data at the size of 16×16 pixel is output. If determining that a certain DS region is the unimportant region, the downsampling unit 131 performs downsampling on the DS region to reduce the number of pixels to ½ both vertically and horizontally, and outputs reduced data at a size of 8×8 pixels.

FIG. 7(c) shows a data rearranging state. If the downsampling unit 131 outputs the reduced data to the data rearrangement unit 132, the data rearrangement unit 132 arranges the reduced data in the DS region in an order of upper left, upper right, and lower left. In addition, the rearrangement unit 132 inserts fill data into 8×8 pixels at the lower right position of the DS region as the fill region (discrimination region). In FIG. 7(c), the reduced DS regions #1 to #3 are arranged in a first DS region and the reduced DS regions #4 to #6 are arranged in a next DS region. Thereafter, the continuous pieces of reduced data #1 to #21 are similarly arranged in the respective DS regions three by three.

If the downsampling unit 131 outputs the unreduced data #22 to the rearrangement unit 132, the data rearrangement unit 132 arranges the data #22 in a new DS region. Thereafter, continuous pieces of reduced data #23 to #27 are output again to the rearrangement unit 132, and arranged in the respective DS regions three by three. At the moment the downsampling unit 131 outputs the unreduced data #28, only two pieces of reduced data (#26 and 27) are arranged in a previous DS region. Due to this, the rearrangement unit 132 inserts the fill data into a lower left blank region in the DS region as the fill region.

Next, if the downsampling unit 131 sequentially outputs the pieces of reduced data #29 to #33 and the unreduced data #34 to the rearrangement unit 132, the rearrangement unit 132 similarly arranges these pieces of data. When the last reduced data #36 is arranged in the DS region, a blank region (lower left region) remains in this DS region, therefore, the fill data is inserted into this blank region. Finally, the rearrangement unit 132 adds three DS regions each consisting of the fill data only to the end of the resultant image data, and reshapes the entire image data into rectangular image data, thus finishing this processing.

In reducing the image data, the rearrangement unit 132 coincides the horizontal size of the reduced image data (the number of pixels in the horizontal direction of the reduced image data) with the size of the original image data, and reduces only the vertical size of the reduced image data. In this way, if the size of the image data in each processing direction of the rearrangement unit 132 is determined based on the original image data, the image enlargement converter 24 can accurately restore the compressed image data to the original image data without information on the size of the original image data. It is, therefore, unnecessary to separately transmit the information on the image size from the transmission side unit Ut to the reception side unit Ur.

Furthermore, the image data in the YUV format consists of one luminance data Y and two pieces of color-difference data U and V. Due to this, the DS region divider 130, the downsampling unit 131, and the rearrangement unit 132 perform their respective processings stated above on each of these three pieces of data.

The data output from the downsampling unit 131 to the rearrangement unit 132 may be only reduced data or unreduced data or may be data having fill data inserted into each blank region of each downsampled DS region (that is, data equal in region size to the original image data).

<JPEG Encoder>

The JPEG encoder 14 includes a block divider 140, a DCT processor 141, a quantizer 142, a coding unit 143, a quantization table T1, and a coding table T2 (see FIG. 4). The image data output from the image compression converter is divided into a plurality of blocks each at a size of 8×8 pixels by the block divider 140. The DCT processor 141 performs a discrete cosine transform (DCT) on each divided block and obtains a DCT coefficient for each block. The respective DCT coefficients thus obtained are quantized by the quantizer 142 using the quantization table T1.

FIG. 8 shows examples of the quantization table T1. Data for specifying quantization step widths is shown in a matrix for every frequency component in the horizontal direction and the vertical direction. Normally, different quantization tables are used between the quantization processing on the luminance data and that on the color-difference data. FIG. 8(a) shows an example of the quantization table for the luminance data whereas FIG. 8(b) shows an example of the quantization table for the color-difference data. Each of these data tables includes data for making the quantization step width larger if the frequency is higher. This tendency is more conspicuous in the quantization table for the color-difference data than that for the luminance data.

At the time of quantizing each DCT coefficient, the quantization processor 142 reads data according to the DCT coefficient from the quantization table T1, multiplies the read data by the quantization factor (quantization coefficient) Q, and uses this multiplication result as the quantization step width for the DCT coefficient. This quantization factor Q is an arbitrary value for adjusting the compression rate and the image quality and given in advance. If the quantization factor Q is made higher, then the quantization step width is increased, and the data compression rate can be improved. However, this is accompanied by generation of a block distortion and degradation of the image quality.

If the adaptive downsampling unit 131 shown in FIG. 6 is used, the data amount of the JPEG compressed data can be reduced by setting the determination threshold Th used in the threshold comparator 36 higher. It is, therefore, possible to obtain a desired compression rate using a relatively low quantization factor Q. However, if this determination threshold Th is made excessively high, a deterioration occurs even to the region including the profile or the fine change. It is, therefore, necessary to determine a combination of the determination threshold Th and the quantization factor Q so that the image data after restoration has a good image quality. Namely, the determination threshold Th is determined based on the quantization factor Q, and the quantization factor Q is determined based on the determination threshold Th.

The coding unit 143 performs a run-length conversion processing in each block for an AC coefficient after the quantization. The coding unit 143 performs a differential processing between the blocks, and encodes the resultant data using entropy codes for the DC coefficient after the quantization. The entropy codes are a coding scheme having a code length according to an appearance probability, and Huffman codes are widely known as the entropy codes. The code table T2 holds a code table for the Huffman codes. The coding unit 143 performs the coding processing using this code table T2.

<Image Expander>

FIG. 9 is a block diagram of an example of a configuration of the image expander 21 shown in FIG. 3. FIG. 9 shows an example of detailed configurations of the JPEG decoder 23 and the image enlargement converter 24.

[JPEG Decoder]

The JPEG decoder 23 includes a decoding unit 230, a dequantizer 231, an inverse DCT processor 232, a quantization table T1, and a code table T2. The JPEG decoder 23 performs inverse processings from those performed by the JPEG encoder 14 to expand the compressed data, and restores the compressed data to the image data before the JPEG compression. It is noted that the quantization table T1 and the code table T2 need to be the same data table as those included in the JPEG encoder 14. The quantization table T1 and the code table T2 can be added to the compressed data if it is necessary to do so, and transmitted from the transmission side unit Ut to the reception side unit Ur.

The decoding unit 230 decodes Huffman codes in the compressed data using the code table T2, and decodes the DC coefficients subjected to the differential processing and the AC coefficients subjected to the run-length conversion. The decoded data is dequantized by the dequantizer 231 using the quantization table T1, thereby restoring the quantized DCT coefficient to the dequantized DCT coefficient for each block. This DCT coefficient is subjected to a inverse DCT processing by the inverse DCT processor 232, thereby restoring the compressed image data to the image data before the JPEG compression processing, i.e., the image data reduced by the image reduction converter 13.

[Image Enlargement Converter]

The image enlargement converter 24 includes a DS region divider 240, an arrangement restoring unit 241, and an interpolation processor 242 and performs inverse processings from those performed by the image reduction converter 13, thereby restoring the reduced data to the image data before the reduction processing. First, the DS region divider 240 divides the image data output from the JPEG decoder 23 into a plurality of DS regions. As each of these DS regions, a DS region equal in size (16×16 pixels in the present embodiment) to each DS region used by the DS region divider 130 of the transmission side unit Ut is used.

The arrangement restoring unit 241 discriminates whether unreduced data or reduced data is arranged in each divided DS region based on the fill region present in the divided DS region, and based on this discrimination result, the arrangement restoring unit 241 rearranges the reduced data and outputs the rearranged reduced data to the interpolation processor 242.

FIGS. 10(a) to 10(e) show all arrangement states of the DS region if the DS region has the size of 16×16 pixels and the reduced data has the size of 8×8 pixels. FIG. 10(a) shows an arrangement state if no fill region is present in the DS region, and the arrangement restoring unit 241 can discriminate that unreduced data is arranged in this DS region for the state shown in FIG. 10(a). The arrangement restoring unit 241 can discriminate this state only by discriminating that a lower right region in the DS region is not the fill region. If FIGS. 10(b) to 10(d) show arrangement states one, two, three pieces of reduced data are arranged in the DS regions, respectively, FIG. 10(e) shows an arrangement state if the DS region consists only of fill regions. The arrangement restoring unit 241 can discriminate each of these states based on the number of fill regions each at the size of 8×8 pixels.

If an arbitrary number of fill regions each at the size of 8×8 pixels are arranged in the DS region at the size of 16×16 pixels, $2^4$ arrangement patterns are considered. If the arrangement patterns shown in FIGS. 10(a) and 10(e) are subtracted from the $2^4$ arrangement patterns, 14 arrangement patterns are present. Namely, four arrangement patterns each including one fill region, six arrangement patterns each including two fill regions, and four arrangement patterns each including three fill regions are present. Needless to say, therefore, arrangement patterns are not limited to those shown in FIGS. 10(b) to 10(d) in the present embodiment but can be arbitrarily selected from the 14 arrangement patterns.

The interpolation processor 242 interpolates pixels and increases the number of pixels for the reduced data output from the arrangement restoring unit 241, thereby restoring the image data to the image data at the original size before the downsampling (that is, the size of the DS region). As this interpolation processing, LP enlargement, linear interpolation, quadratic interpolation, cubic interpolation or the like can be performed. The LP enlargement is a method for restoring the image data to the image data before the downsampling by estimating the high frequency component lost in the downsampling performed by the downsampling unit. The interpolation processor 242 does not interpolate the unreduced data. In this way, the image data is restored to the image data before the image reduction converter 13 performs the size reduction, and the image data before the size reduction is output to the RGB converter 20.

The compressed image data in the YUV format consists of compressed data of one luminance data Y and two pieces of compressed data on the color-difference data U and V, and the DS region divider 240, the arrangement restoring unit 241, and the interpolation processor 242 perform their respective processings stated above on each of the three pieces of compressed data.

In the above-mentioned embodiment, the instance in which the image data is divided into a plurality of DS regions each at the size of 16×16 pixels, and in which part of the DS regions are downsampled to those at the size of 8×8 pixels has been described. However, the present invention is not limited to the instance of these numbers of pixels.

<32×32 DS Region>

FIGS. 11(*a*) to 11(*c*) show states of dividing the image data into a plurality of DS regions each at a size of 32×32 pixels, downsampling part of the DS regions to reduced data each at a size of 8×8 pixels, and rearranging the reduced data. FIG. 11(*a*) shows that the entire image data is divided into a plurality of DS regions each at the size of 32×32 pixels. FIG. 11(*b*) shows that the DS regions that are not the important regions are downsampled to reduce the number of pixels to ¼ both vertically and horizontally, and that these DS regions are converted into reduced data each at the size of 8×8 pixels. FIG. 11(*c*) shows that continuous pieces of reduced data are collected and rearranged in the same DS region, thereby reducing the size of the entire image data.

In the example of FIGS. 11(*a*) to 11(*c*), the size of the entire image data after the reduction is larger than that in the example of FIGS. 7(*a*) to 7(*c*). However, if the entire image data is made far larger and many continuous unimportant regions are present, the size of the entire image regions can be made smaller than that according to the method shown in FIGS. 7(*a*) to 7(*c*).

Second Embodiment

In the image compression and expansion system according to the first embodiment, the arrangement restoring unit 241 of the image enlargement converter 24 discriminates whether the unreduced data or the reduced data is arranged in each DS region based on the position of the fill region present in the DS region. Due to this, if a part of the unreduced data or the reduced data coincides with the fill data, there is a probability that the arrangement restoring unit 241 makes an erroneous discrimination. In the present embodiment, an image compression and expansion system capable of preventing such erroneous discrimination will be described.

Normally, a quantization error occurs to the image data compressed by the JPEG encoder 14. Namely, if an arbitrary value is adopted as the fill data, the fill data inserted into the image data by the image reduction converter 13 may possibly be changed to different data by the time the image data is input to the image enlargement converter 24 through the JPEG compression processing and the JPEG expansion processing. In this case, the arrangement restoring unit 241 can not accurately discriminate the reduced data.

As possible first measures for avoiding this erroneous discrimination, the image enlargement converter 24 adopts a discrimination method capable of discriminating the fill data even if the quantization error occurs. Namely, if the arrangement restoring unit 241 discriminates that pixel data in a range in which the pixel data has a width based on a maximum quantization error around the fill data is fill data, it is possible to accurately discriminate the fill data even when the quantization error occurs to the image data.

As possible second measures, the image enlargement converter 24 adopts a value free from the influence of the quantization error as the fill data. Namely, if one of quantization steps in the quantizer 142 is adopted as the fill data, then the fill data is not changed to a different value by the quantization, and the arrangement restoring unit 241 can accurately discriminate the reduced data.

However, in the JPEG encoder 14, each quantization step width is obtained using the quantization table T1 and the quantization factor Q, and each quantization step is determined based on this quantization step width. Due to this, if the quantization table T1 and the quantization factor Q are changed, then the maximum quantization error and the quantization step are changed, and the fill data should be changed. Nevertheless, only a value zero that serves as a reference value based on which the quantization step is obtained from the quantization step width always remains equal to the quantization step despite the quantization step width. It is, therefore, preferable to adopt the second measures and to adopt the value 0 during the quantization as the fill data.

In the JPEG encoder 14, a central value is subtracted from each pixel data to shift a level of the pixel data, the level-shifted pixel data is converted into decoded data, and the resultant decoded data is subjected to the DCT processing for convenience of an arithmetic processing. In the JPEG decoder 23, the central value is added to each pixel data that has been subjected to the inverse DCT processing, thereby restoring the pixel data to the original pixel data. Therefore, this central value may be adopted as the fill data.

Normally, each pixel data is expressed by eight bits and a value of the pixel data ranges from zero to 255, due to this, in the JPEG encoder 14, the central value 128 is subtracted from each pixel data and the pixel data is converted into the signed data. Namely, a DC coefficient of zero at the time of the quantization corresponds to the average value 128 of the pixel data. Therefore, if the fill data is the central value 128 of the pixel data, then all the DCT coefficients during the quantization are all zero, and the fill data is free from the influence of the quantization error despite the quantization step width.

As already stated, the compression and expansion processings according to the JPEG standards ("JPEG compression and expansion processings") employ the quantization table T1 (see FIG. 8) having the larger quantization step width at the higher frequency component. For this reason, the image data after the restoration through the JPEG compression and expansion processings may possibly include blocks narrowed down only to a DC component during the compression. In such a block, all the pixels are coincident with one another in value after the restoration and the coincident value is an average value (where the value is an integer) of the pixel data before the compression. Accordingly, if the average value of the pixel data that constitutes the JPEG block is a value closer to the fill data, all the pixels in the JPEG block coincide with the fill data after the pixel data is subjected to the JPEG compression and expansion processings, as a result, it is often impossible to discriminate which is the fill region. Namely, the arrangement restoring unit 241 erroneously discriminates the fill region, with the result that the image enlargement converter 24 may possibly be unable to accurately restore the compressed image data to the original image data.

To prevent such fill region erroneous discrimination, it is necessary that the rearrangement unit 132 processes the JPEG block for which the average value of the pixel data is closer to 128 so that the average value is farther from 128. Specifically, a maximum change width of the average value in the block by the JPEG compression and expansion processings is smaller than α, the pixel data is changed so that the average value is either 128+α or 128−α for the block for which the difference between the average value before the JPEG compression and 128 is smaller than α. For instance, if the pixel data in the block is f(x, y) and satisfies the following expression 5, it is necessary to change the average value of the image data to 128−α in advance and if the pixel data f(x, y) satisfies the following expression 6, it is necessary to change the average value of the image data to 128+α in advance.

$$128 - \alpha < \frac{1}{64}\sum_{x=0}^{7}\sum_{y=0}^{7} f(x, y) \leq 128 \quad (5)$$

$$128 \leq \frac{1}{64}\sum_{x=0}^{7}\sum_{y=0}^{7} f(x, y) < 128 + \alpha \quad (6)$$

A method for determining such a α will be described. In the DCT processing according to the JPEG, the DC coefficient is calculated as represented by the following equation 7. Due to this, if the average value in the JPEG block is changed only by α, the DC coefficient is changed only by 16α. For instance, if α is added to each pixel data, the DC coefficient is increased only by 16α.

$$DC = \frac{1}{4}\sum_{x=0}^{7}\sum_{y=0}^{7} f(x, y) \quad (7)$$

As stated above, the quantizer 142 quantizes the DC coefficient by the quantization step width determined according to the quantization table T1 and the quantization factor Q. For the DC coefficient, the data on the upper left end of the quantization table T1 shown in FIG. 8 is used. This data is normally 16 and 16Q is used as the quantization step width. In this case, a quantization error of the DC coefficient except for an error related to operation accuracy is smaller than 16Q. Accordingly, as long as 16α≧16Q (that is α≧Q) is satisfied, the average value in the block after the JPEG compression and expansion processings is not changed to 128 if the average value in the block is 128−α or 128+α.

Considering the influence of the change of the pixel data on the image quality, it is preferable that α is as small as possible. From these viewpoints, it is preferable that α is Q (α=Q). However, at α<2Q, the image data after the restoration is basically equal to the image data at α=Q, therefore, in view of the operation accuracy error, it is more preferable to determine α within a range of Q<α<2Q.

Specifically, the rearrangement unit 132 applies four JPEG blocks (each at the size of 8×8 pixels) that constitute the unreduced data at the size of 16×16 pixels and the reduced data at the size of 8×8 pixels to each of the expressions 5 and 6. As a result, if the expression 5 is satisfied, the same value is added to each pixel in the block so that the average value is equal to 128+α. If the expression 6 is satisfied, the same value is subtracted from each pixel in the block so that the average value is equal to 128−α.

Third Embodiment

In the first embodiment, the instance of dividing the entire image into the DS regions at the equal size has been described. In the present embodiment, by contrast, an instance of dividing the entire image into DS regions at different sizes and using different reduction rates in downsampling will be described.

FIGS. 12(a) to 12(c) show an example of an operation performed by an image compression and expansion system according to the third embodiment of the present invention.

FIG. 12(a) shows a state in which a DS region divider 130 divides the image into DS regions. The DS region divider 130 divides the entire image into DS regions with a mixture of two or more different sizes. In the present embodiment, large DS regions each at a size of 32×32 pixels and small DS regions each at a size of 16×16 pixels are mixed together. On this occasion, the DS region divider 130 divides the image so that the important region is included in small DS regions. In addition, the DS region divider 130 divides the image so that a part of the unimportant region away from the important region is included in large DS regions and a part thereof closer to the important region is included in small DS regions.

Specifically, the DS region divider 130 divides image data with a size of 96×96 pixels input from the image input apparatus 101 and into seven large DS regions (#1 to #3, #4, #7, #10, and #13) and eight small regions (#5, #6, #8, #9, #11, #12, #14, and #15). In addition, the DS region divider 130 outputs image data of the respective DS regions to the downsampling unit 131. Among the image regions, the DS regions #9, #12, and #15 are the important regions, each of which is divided into small DS regions.

FIG. 12(b) shows a state in which the downsampling unit 131 performs downsampling. The downsampling unit 131 performs downsampling on each unimportant DS region to convert the image data of the DS region into reduced data at a size of 8×8 pixels. Namely, the downsampling unit 131 performs the downsampling on each DS region at a reduction rate according to the size of the DS region, and converts the image data of each DS region into the reduced data at the equal size despite sizes of the respective DS regions.

Specifically, for the large DS regions (#1 to #3, #4, #7, #10, and #13) each at the size of 32×32 pixels obtained by dividing the image by the DS region divider 130, the downsampling unit 131 performs downsampling thereon to reduce the number of pixels to ¼ both vertically and horizontally. For the small DS regions (#5, #6, #8, #11, and #14) each at the size of 16×16 pixels obtained by dividing the image by the DS region divider 130, the downsampling unit 131 performs downsampling thereon to reduce the number of pixels to ½ both vertically and horizontally. As a result, a plurality of pieces of unreduced data (#9, #12, and #15) each at the size of 16×16 pixels and a plurality of pieces of reduced data each at the size of 8×8 pixels are output to the rearrangement unit 132.

FIG. 12(c) shows a state in which the rearrangement unit 132 rearranges data. The rearrangement unit 132 rearranges the reduced data in each small DS region (at the size of 16×16 pixels). The downsampling unit 131 discriminates the reduced data downsampled to ¼ in size (¼ reduced data) from the reduced data downsampled to ½ in size (½ reduced data). Therefore, the rearrangement unit 132 rearranges the data so as not to mix up the ¼ reduced data and the ½ reduced data in the same DS region.

Further, arrangement of the fill region and the reduced data in each DS region is made different between an instance of arranging the ¼ reduced data and an instance of arranging the ½ reduced data so that the ½ reduced data and the ¼ reduced data can be discriminated from each other based on the fill region(s). Specifically, if the ½ reduced data is to be arranged in the DS region, then the fill region is arranged at a lower right position of the DS region, and the pieces of reduced data are arranged at an upper left position, an upper right position, and a lower left position in this order, similarly to the first embodiment. If the ¼ reduced data is to be arranged in the DS region, then the fill region is arranged at an upper left position of the DS region, and the pieces of reduced data are arranged at the lower right position, the lower left position, and the upper right position in this order.

Since the pieces of reduced data #1 to #3 are ¼ reduced data, the fill region is arranged at the upper left position of the DS region at a size of 16×16 pixels, and the respective pieces of reduced data are arranged from the lower right position in a predetermined order. Since the reduced data #4 is also ¼ reduced data, it is similarly arranged in the next DS region. Since subsequent pieces of reduced data #5 and #6 are ½ reduced data, they are not arranged in the same DS region as that in which the reduced data #4 is arranged but arranged in a new DS region. Accordingly, the fill data is inserted into each blank region of the DS region in which the reduced data #4 is arranged, a fill region is arranged at a lower right position in the next DS region, and the pieces of reduced data #5 and #6 are arranged in the next DS region from the upper left position in a predetermined order. Since the next reduced data #7 is ¼ reduced data, it is arranged in a different DS region from that in which the pieces of reduced data #5 and #6 are arranged. Thereafter, pieces of unreduced data and reduced data are sequentially, similarly arranged in the DS regions.

If FIG. 12(c) is compared with FIG. 11(c), it is understood that the entire image can be further reduced although the important regions are not subjected to downsampling and each unimportant region is subjected to downsampling to be converted into the ¼ reduced data.

FIGS. 13(a) to 13(h) show all arrangement states of the DS region if the DS region has the size of 16×16 pixels and the reduced data has the size of 8×8 pixels. FIG. 13(a) shows an arrangement state if no fill region is present in the DS region, and it can be discriminated that the unreduced data is arranged. This discrimination can be performed only by discriminating that an upper left region and a lower right region in the DS region are not the fill regions. FIGS. 12(b) to 12(d) show arrangement states if three, two, and one pieces of ½ reduced data are arranged in the DS regions, respectively, and FIGS. 12(e) to 12(g) show arrangement states if three, two, and one pieces of ¼ reduced data are arranged in the DS regions, respectively, and FIG. 12(h) shows a state in which the DS region consists only of fill regions. The arrangement restoring unit 241 can discriminate each of these states based on the arrangement of the fill regions each at the size of 8×8 pixels. Arrangement methods for the instances of FIGS. 12(b) to 12(g) are not limited to this embodiment but can be arbitrarily selected from the 14 arrangement patterns stated above.

Fourth Embodiment

In the third embodiment, the instance of dividing the entire image into the DS regions at different sizes and using different reduction rates among the DS regions at the different sizes in the downsampling has been described. In the present embodiment, by contrast, an instance of dividing the entire image into DS regions at an equal size and performing downsampling hierarchically will be described.

In the present embodiment, the downsampling unit 131 performs downsampling twice (or three or more times) on a part of the DS regions that do not contain important regions. Namely, for a plurality of DS regions, the downsampling unit 131 performs downsampling thereon to obtain a plurality of pieces of reduced data thereafter, the downsampling unit 131 performs downsampling again on a group of these pieces of reduced data. In this case, for each DS region that has been subjected to downsampling twice, the same result can be obtained as that if the DS region is subjected to downsampling at a reduction rate twice as high as that for the former downsampling except for the operation accuracy-related error and a difference resulting from the filter processing. In other words, even if hierarchical downsampling is performed, substantially the same result as that according to the third embodiment can be obtained.

FIGS. 14(a) to 14(c), 15(d) and 15(e) show an example of an operation performed by an image compression and expansion system according to the fourth embodiment of the present invention. FIG. 14(a) shows a state in which the DS region divider 130 divides the image into DS regions. The DS region divider 130 divides the entire image into DS regions (#1 to #36) each at a size of 16×16 pixels exactly equally to the first embodiment. Among the DS regions, the DS regions #22, #28, and #34 are the important regions.

FIG. 14(b) shows a state in which the downsampling unit 131 performs first downsampling. The downsampling unit 131 performs downsampling on each of the DS regions, which is the unimportant region, to convert the image data of each of the DS regions into ½ reduced data at a size of 16×16 pixels. The operation stated so far is the same as that according to the first embodiment.

FIG. 14(c) shows a state of grouping the pieces of reduced data. The downsampling unit 131 groups four adjacent ½ reduced data, thereby generating a new DS region at a size of 16×16 pixels. Namely, the downsampling unit 131 collects adjacent reduced data #1, #2, #7, and #8 to generate a new DS region #A, and collects adjacent reduced data #3, #4, #9, and #10 to generate a new DS region #B. Likewise, the downsampling unit 131 generates new DS regions #A to #G. During grouping, the downsampling unit 131 leaves the reduced data #15, #16, #21, #27, and #C33 that can not be grouped, uncollected.

FIG. 15(d) shows a state in which the downsampling unit 131 performs second downsampling. The second downsampling is performed only on the grouped new DS regions, and ¼ reduced data at a size of 8×8 pixels is generated for each of these regions. At the time the second sampling is completed, the state is equal to the state shown in FIG. 12(b) according to the third embodiment.

FIG. 15(e) shows a state in which the rearrangement unit 132 performs data rearrangement. The rearrangement unit 132 discriminates the ¼ reduced data downsampled twice from the ½ reduced data downsampled once, and rearranges the reduced data so as not to arrange a mixture of the ¼ reduced data and the ½ reduced data in the same DS region. The arrangement methods are the same as those according to the third embodiment.

Fifth Embodiment

In the above mentioned embodiment, the image reduction converter 13 and the image enlargement converter 24 perform their respective processings similarly on each of the luminance data Y and the color-difference data U and V. The processings on these respective pieces of data have been described without discrimination. In the present embodiment, an instance in which a processing on the luminance data Y is made different from processings on the color-difference data U and Y will be described.

FIG. 16 is a block diagram of an example of a configuration of an important element of an image compression apparatus according to the fifth embodiment of the present invention and shows a detailed configuration of the image reduction converter 13 shown in FIG. 2. This image reduction converter 13 includes a DS region divider 130 common to the data Y, U, and V, three downsampling units 131 and 131s corresponding to the respective data Y, U, and V, and three rearrangement units 132 and 132s corresponding to the respective data Y, U, and V.

The DS region divider 130 divides the image into DS regions for each of the luminance data Y and the color-difference data U and V and performs the same DS region dividing processing as that according to the first embodiment. Namely, for each of the data Y, U, and V, the DS region divider 130 divides the image into DS regions so that the same pixel data belongs to the same DS region.

The downsampling unit 131 is an adaptive downsampling unit that performs downsampling on the luminance data Y. The downsampling unit 131 determines whether the target DS region is the important region or not, and performs downsampling based on this determination result, similarly to the first embodiment (see FIG. 6). On the other hand, the two downsampling units 131s perform downsampling on the color-difference data U and V, respectively. Each of the downsampling units 131s determines whether to perform downsampling according to the determination result of the downsampling unit 131 for the luminance data.

FIG. 17 is a block diagram of an example of a detailed configuration of the downsampling unit 131s shown in FIG. 16. This downsampling unit 131s differs from the adaptive downsampling unit 131 shown in FIG. 6 in that the downsampling unit 131s does not include the subtracter 33 for controlling the output selector 32 and the downsampling determination unit ("DS determination unit") 34. Due to this, the output selector 32 operates based on a determination result of the DS determination unit 34 in the downsampling unit 131 for the luminance data Y. Namely, if downsampling is performed on the same DS region for the luminance data Y, downsampling is also performed thereon for the color-difference data U and V, and if downsampling is not performed on the DS region for the luminance data Y, downsampling is not performed on the color-difference data U and V, either.

The rearrangement unit 132 rearranges the reduced data for the luminance data Y. Similarly to the first embodiment, the rearrangement unit 132 rearranges the reduced data and arranges a discrimination region consisting of the fill data at a predetermined position in the DS region in which the reduced data is arranged. The rearrangement unit 132s rearranges the reduced data for each of the color-difference data U and V. During this rearrangement, even if the reduced data is arranged in the DS region, the rearrangement unit 132s does not rearrange the discrimination region consisting of the fill data in the DS region. Therefore, as compared with the luminance data Y, more pieces of reduced data can be arranged in the same DS region.

FIGS. 18(a) and 18(b) show an example of an operation performed by the image compression and expansion system according to the fifth embodiment of the present invention. FIGS. 18(a) and 18(b) relate to the same image data as that shown in FIG. 7 (according to the first embodiment), FIG. 18(a) shows a state of rearranging the luminance data Y, and FIG. 18(b) shows a state of rearranging the color-difference data U and V.

Since the rearrangement processing related to the luminance data Y is performed by the same method as that described in the first embodiment, it will not be described herein. For the color-difference data U and V, at the time of rearranging continuous pieces of reduced data in the DS regions, four pieces of reduced data are arranged in one DS region. Due to this, if the downsampling unit 131s inputs five or more pieces of reduced data continuously to the corresponding rearrangement unit 132s, the rearrangement unit 132s arranges fifth and the following pieces of reduced data in the next DS region. Namely, until the number of pieces of reduced data reaches a maximum number of pieces of reduced data that can be arranged in one DS region, the pieces of reduced data are packed in each DS region. On the other hand, if the number of pieces of continuous reduced data is three or less, the fill data is inserted into each blank region. In FIG. 18(b), the pieces of reduced data #1 to #4 are arranged in a first DS region, and the pieces of reduced data #5 to #8 are arranged in a next DS region. Thereafter, continuous pieces of reduced data #1 to #21 are similarly arranged in the DS regions four by four. The other processings are the same as those for the luminance data Y.

In this case, for the rearranged color-difference data U and V, no discrimination regions each consisting of the fill data are arranged. It is, therefore, impossible to discriminate whether the data is reduced or unreduced based on the rearranged color-difference data U and V during rearrangement and restoration. According to the present embodiment, by contrast, the DS region to be subjected to downsampling is common to the color-difference data U and V and the luminance data Y. In addition, the JPEG compressed color-difference data U and V are transmitted together with the JPEG compressed luminance data Y from the transmission side unit Ut to the reception side unit Ur. It is, therefore, possible to discriminate whether the data is reduced or unreduced for the rearranged color-difference data U and V based on the rearranged luminance data Y, and restore arrangement to original arrangement of the color-difference data U and V.

FIG. 19 is a block diagram of an example of a configuration of an important element of the image expansion apparatus according to the fifth embodiment of the present invention and shows a detailed configuration of the image enlargement converter 24 shown in FIG. 3. This image enlargement converter 24 includes the DS region divider 240 common to the data Y, U, and V, three arrangement restoring units 241 and 241s corresponding to the respective data Y, U, and V, and an interpolation processor 242 common to the data Y, U, and V.

The DS region divider 240 divides each of the luminance data Y and the color-difference data U and V output from the JPEG decoder 23 into a plurality of DS regions and performs the same DS region dividing processing as that according to the first embodiment.

The arrangement restoring unit 241 performs restoration of the arrangement of the luminance data Y, and similarly to the first embodiment, discriminates whether a target DS region is reduced data or unreduced data. Based on this discrimination result, the arrangement restoring unit 241 restores the arrangement of the data to the original arrangement. The two arrangement restoring units 241s perform restoration of the arrangement of the color-difference data U and V, respectively. Each arrangement restoring unit 241s discriminates whether a target DS region is reduced data or unreduced data based on the discrimination result of the arrangement restoring unit 241 for the luminance data.

Namely, the arrangement of the reduced data and the unreduced data is determined uniquely if an appearance order of these pieces of data is determined. Due to this, it is possible to recognize the arrangement of the reduced data and the unreduced data for the rearranged color-difference data U and V from the discrimination result of the arrangement restoring unit 241 for the luminance data Y. The arrangement restoring units 241s thus perform restoration of the arrangement of the color-difference data U and V, respectively.

Sixth Embodiment

In the fifth embodiment, the instance in which the YUV converter 10 converts the image data in the RGB format into the image data in the YUV444 format, and in which the number of pieces of data for the luminance data after conversion is equal to the number of pieces of data for the color-difference data after conversion has been described. On the contrary, in the present embodiment, an instance in which the YUV converter 10 converts the image data in the RGB format into the image data in the YUV422, YUV420 format or the like, and in which the number of pieces of data for the luminance data after conversion is different from the number of pieces of data for the color-difference data after conversion will be described.

Normally, a human eye is lower in discrimination power for a color component than for a luminance component, and lower in discrimination power for the horizontal direction than for the vertical direction. In such a format as the YUV422 or YUV420 format, the number of pieces of data for the color-difference data is set smaller than that of pieces of data for the luminance data using these visual characteristics. Namely, for the image data in the YUV422, YUV420 format or the like converted from the RGB format by the YUV converter 10, the number of pieces of data for the luminance data Y does not coincide with the number of pieces of data for the color-difference data U and V. Accordingly, if the DS region divider 130 divides the luminance data Y and the color-difference data U and V into the DS regions at the equal size, respectively, the DS regions for the color-difference data U and V do not coincide with the respective DS regions for the luminance data Y. In the following description, each DS region for the color-difference data U and V will be referred to as a "color-difference DS region" and each DS region for the luminance data Y will be referred to as a "luminance DS region" so as to discriminate them from each other if it is necessary to do so.

FIGS. 20(a) and 20(b) show an example of the image data in the YUV422 format. In the YUV422 format, the number of pieces of horizontal data for the color-difference data U and V is half as large as that of pieces of horizontal data for the luminance data Y. Each color-difference data U and V is made to correspond to two horizontally adjacent pieces of luminance data Y. Due to this, each color-difference DS region corresponds to horizontally adjacent two luminance DS regions.

FIG. 20(a) shows a DS region dividing state for the luminance data Y, and FIG. 20(b) shows a DS region dividing state for the luminance data Y. Image data in the YUV422 format at a size of 96×96 pixels is constituted by the luminance data Y at a size of 96×96 pixels and the color-difference data U and V each at a size of 48×96 pixels. The DS region divider 130 divides each of the luminance data Y and the color-difference data U and V into a plurality of DS regions each at a size of 16×16 pixels. Thus, the luminance data Y is divided into 36 luminance DS regions (#1 to #36), each of the color-difference data U and V is divided into 18 color-difference DS regions (#1 to #18). In this case, a color-difference DS region #n corresponds to luminance DS regions #2n−1 and #2n (where n is an integer from 1 to 18).

Each of the downsampling units 131s for the color-difference data U and V determines whether or not to perform downsampling on the color-difference DS region #n based on determination results of the downsampling unit 131 related to the two luminance DS regions #2n−1 and #2n corresponding to the color-difference DS region #n. Specifically, if both of the two luminance DS regions #2n−1 and #2n are the important regions, the downsampling unit 131s determines that the color-difference DS region #n is the important region and does not perform downsampling thereon. On the other hand, if one of or both of the two luminance DS regions #2n−1 and #2n are the unimportant regions, the downsampling unit 131s determines that the color-difference DS region #n is the unimportant region and performs downsampling thereon. In FIG. 20, since the luminance DS regions #21, #22, #27, #28, #33, and #34 are the important regions, the color-difference regions #11, #14, and #17 are the important regions. However, as to whether to perform downsampling on the color-difference DS region #n if one of the two luminance DS regions #2n−1 and #2n is the important region and the other is the unimportant region can be arbitrarily set in advance.

FIGS. 21(a) and 21(b) show an example of an operation performed by the image compression and expansion system according to the sixth embodiment of the present invention. FIG. 21(a) shows a data rearranging state for the luminance data Y shown in FIG. 20. FIG. 21(b) shows a data rearranging state for the color-difference data U and V shown in FIG. 20.

The rearranging unit 132 rearranges the reduced data output from the downsampling unit 131 so that the number of pieces of horizontal data for the luminance data Y input to the image reduction converter 13 coincides with that for the luminance data Y output from the image reduction converter 13. In FIG. 21(a), the rearrangement unit 132 rearranges the reduced data so that the number of pieces of horizontal data is 96.

Exactly in the same manner as that for the rearrangement unit 132, the rearrangement unit 132s rearranges the reduced data output from the downsampling unit 131s so that the number of pieces of horizontal data for the color-difference data U or V input to the image reduction converter 13 coincides with that for the color-difference data U or V output from the image reduction converter 13. In FIG. 21(b), the rearrangement unit 132s rearranges the reduced data so that the number of pieces of horizontal data is 48.

In the present embodiment, the color-difference DS region does not coincide with the luminance DS region. However, according to the YUV format, the color-difference DS region is made to correspond to the luminance DS region. Due to this, similarly to the fifth embodiment, it is possible to discriminate whether the data is reduced data or unreduced data for the rearranged color-difference data U and V based on discrimination information included in the rearranged luminance data Y, and restore arrangement of the data to original arrangement.

Some JPEG compressor (e.g., JPEG chip) include the YUV converter 10 that converts the RGB format into the YUV422 format in front of the JPEG encoder 14, and adopt the RGB format as the format of input image data. If such a JPEG compressor is employed as the image compressor 11 shown in FIG. 2, the image data in the YUV format output from the image reduction converter 13 is temporarily converted into the image data in the RGB format, and the resultant image data is input to the JPEG compressor.

In this case, the YUV converter 10 provided in front of the image reduction converter can select an arbitrary format such as the YUV444, YUV422 format and the like. If the YUV422 format is selected, the image reduction converter 13 operates similarly to that according to the above-mentioned embodiment. If the YUV444 format is adopted, it is preferable to set a size of the reduced data in the downsampling processing in view of re-conversion of the YUV444 format into the YUV422 format in the JPEG compressor. That is, it is preferable that for the color-difference data, two horizontally adjacent DS regions are combined into a new DS region, and that this new DS region is subjected to downsampling.

It is noted, however, that if the DS region divider 130 sets a size of each of the DS regions related to the luminance data Y and the color-difference data U and V, and the image is divided into the new DS regions mentioned above for the color-difference data U and V, it is unnecessary to perform the combining processing. For instance, if the YUV422 format is adopted, then the DS region divider 130 divides the image into a plurality of DS regions each at a size of 16×16 pixels for the luminance data Y and divides the image into a plurality of DS regions each at a size of 32×16 pixels, which is twice as large as the number of horizontal pixels of the DS region for the luminance data Y, for the color-difference data.

Seventh Embodiment

In the fifth and the sixth embodiments, the instance in which pieces of reduced data of the color-difference data U and V are packed and rearranged in one color-difference DS region, and in which pieces of unreduced data thereof are not rearranged has been described. According to the present embodiment, by contrast, an instance of rearranging both the reduced data and the unreduced data will be described.

FIG. 22 is a block diagram of an example of a configuration of an image reduction converter 13 according to the seventh embodiment of the present invention. This image reduction converter 13 differs from that shown in FIG. 16 (according to the fifth embodiment) in that the converter 13 includes two unreduced data dividers 134.

Each of the unreduced data dividers 134 divides unreduced data output from the downsampling unit 131s for the color-difference data U or V into a plurality of pieces of data equal in size to those for the reduced data, and outputs the divided unreduced data to the rearrangement unit 132s. The rearrangement unit 132s rearranges the reduced data and the unreduced data without discriminating them from each other exactly in the same manner as that for the reduced data according to the fifth or sixth embodiment. Namely, pieces of reduced data or unreduced data are packed and rearranged in each color-difference DS region until the number of pieces of data reaches a maximum number of pieces of data that can arranged in one color-difference DS region.

FIGS. 23 and 24 show an example of an operation performed by an image compression and expansion system according to the seventh embodiment of the present invention. FIGS. 23(*a*) to 23(*c*) show an example of the operation up to an unreduced data dividing processing performed in the image reduction converter 13 shown in FIG. 22. FIG. 23(*a*) shows an example of the color-difference data U or V output from the DS region divider 130. This color-difference data U or V is the same as that shown in FIG. 20 (according to the sixth embodiment). The DS region divider 130 divides the color-difference data U or V into a plurality of color-difference DS regions #1 to #18 each at a size of 16×16 pixels. Among these, the color-difference DS regions #11, #14, and #17 are assumed as the important regions and the other color-difference DS regions are assumed as the unimportant regions.

FIG. 23(*b*) shows reduced data and unreduced data output from the downsampling unit 131s. The downsampling unit 131s performs downsampling on each unimportant region to convert the image data in the unimportant region into reduced data at a size of 8×8 pixels. On the other hand, the downsampling unit 131s does not perform downsampling on each important region and outputs pieces of data each at a size of 16×16 pixels as the unreduced data.

FIG. 23(*c*) shows reduced data and divided data output from each unreduced data divider 134. The unreduced data divider 134 outputs the reduced data input from the corresponding downsampling unit 131s without processing it. In addition, the unreduced data divider 134 divides the unreduced data into four pieces of reduced data each equal in size (8×8 pixels) to the reduced data. In FIG. 23(*c*), each of the unreduced data #11, #14, and #17 that are not subjected to downsampling is divided into four pieces of unreduced data to generate 12 pieces of divided data #11*a* to #11*d*, #14*a* to #14*d*, and #17*a* to #17*d*.

FIGS. 24(*a*) and 24(*b*) show an example of an operation performed by the rearrangement unit 132s shown in FIG. 22. This rearrangement unit 132s rearranges the reduced data and the divided data. During this rearrangement, the rearrangement unit 132s can rearrange four pieces of reduced data or divided data in each color-difference DS region similarly to the fifth embodiment, however, in the present embodiment, the rearrangement unit 132s sequentially arranges the pieces of reduced data or divided data in the horizontal direction. Namely, the rearrangement unit 132s starts arrangement at an upper left part of the image data, and sequentially arranges pieces of reduced data or divided data from left to right in the horizontal direction. When reaching a right end of the image data, the rearrangement unit 132s shifts arrangement position to a downward direction, and sequentially arranges pieces of reduced data or divided data from left to right in the horizontal direction again. The rearrangement unit 132s thus repeatedly performs this operation. If pieces of divided data are to be arranged, the rearrangement unit 132s continuously arranges four pieces of divided data that constitute one unreduced data.

If the image reduction converter 13 thus rearranges the color-difference data U or V in the horizontal direction, it is unnecessary to divide the data into a plurality of color-difference DS regions when the image enlargement converter 24 restores the rearranged color-difference data U and V. Due to this, the color-difference data U and V output from the JPEG decoder 23 is input to the arrangement restoring unit 241s without via the DS region divider 240.

The unreduced data that is not subjected to downsampling is larger in size than the reduced data. However, if the unreduced data is divided into a plurality of pieces of divided data each equal in size to the reduced data, even if a mixture of the reduced data and the unreduced data is present, it is possible to pack these pieces of data without blanks and rearrange them. Accordingly, it suffices that the fill data is added to a lowermost portion of the image data so as to reshape the image data into rectangular data, so that the size of the color-difference data U and V after the rearrangement can be made smaller.

During restoration in the image enlargement converter 24, the arrangement restoring unit 241 performs not only restoration of the arrangement of the reduced data but also that of the arrangement of the divided data. Needless to say, a divided data arrangement restoring processing can be performed based on the discrimination information included in the luminance data Y similarly to the reduced data arrangement restoring processing.

FIGS. 25 and 26 are explanatory views for comparing the image reduction converter according to the sixth embodiment with that according to the seventh embodiment. FIG. 25 shows an example of image data in which the important regions and the unimportant regions repeatedly appear in the horizontal direction. This is image data in the YUV422 format at a size of 128×96 pixels. Each of the luminance DS region and the color-difference DS region has a data size of 16×16 pixels. The luminance data Y is divided into 48 luminance DS regions #1 to #48, and each of the color-difference data U and V is divided into 24 color-difference DS regions #1 to #24. Since the important regions and the unimportant regions repeatedly appear in the horizontal direction of this image data, a conspicuous difference is generated between the processing result of the image reduction converter 13 according to the sixth and seventh embodiments.

FIGS. 26(*a*) and 26(*b*) show output data if the image data shown in FIG. 25 is input to the image reduction converter 13 according to the sixth and seventh embodiments. FIG. 26(*a*) shows a state after the rearrangement according to the sixth embodiment, and FIG. 26(*b*) shows a state after the rearrangement according to the seventh embodiment.

As already stated, in the image reduction converter 13 according to the sixth embodiment, it is necessary to insert the discrimination region into the luminance data Y but unnecessary to insert the discrimination region into each of the color-difference data U and V. Due to this, if the size of the luminance data Y is compared with that of each of the color-difference data U and V after the rearrangement, the color-difference data U and V are normally smaller in size than the luminance data Y. However, in the image data shown in FIG. 25, the important regions and the unimportant regions repeatedly appear in the horizontal direction, therefore, if the number of pieces of horizontal data for the luminance data Y is different from that for the color-difference data U or V similarly to the image data in the YUV422 format, the above-mentioned size relationship after the rearrangement between the luminance data Y and the color-difference data U or V after the rearrangement is often inverted.

In FIG. 26(*a*), the luminance data Y is reduced while the color-difference data U or V is not reduced. To cause the JPEG encoder 14 to perform the compression processing, it is necessary to make a vertical length of the luminance data Y coincident with that of the color-difference data U or V. Therefore, the rearrangement unit 132 also adds the fill data to an end of the luminance data Y (a part surrounded by a broken line). As a result, the image data is not at all reduced by the image reduction converter 13.

In FIG. 26(*b*), by contrast, the luminance data Y and the color-difference data U and V are both reduced, and the image reduction converter 13 reduces the image data. In the seventh embodiment, the unreduced data for the color-difference data U or V is divided into a plurality of pieces of divided data, and the pieces of divided data are rearranged together with the pieces of reduced data efficiently. Due to this, even if the important regions and the unimportant regions repeatedly appear, inversion of the compression rate does not occur differently from the sixth embodiment.

Each of the image compressor 11 and the image expander 21 according to each of the embodiments can be provided as a computer program executable on a calculator such as a personal computer. Further, each of the JPEG encoder 14 and the JPEG decoder 23 can be constituted by general-purpose hardware such a JPEG chip or a PC add-on board that can perform processing at high rate. Each of the image reduction converter 13 and the image enlargement converter 24 can be constituted by a computer program. These computer programs are provided by storing them in an optical storage medium such as a CD-ROM, a magnetic storage medium such as a flexible disc, or a semiconductor storage medium such as an IC memory. Furthermore, these computer programs can be provided through an electric communication line such as the Internet or the LAN (Local Area Network).

BRIEF DESCRIPTION OF THE DRAWINGS

FIG. 1 is a block diagram of an example of a configuration of an image compression and expansion system according to a first embodiment of the present invention.

FIG. 2 is a block diagram of an example of a configuration of a transmission side unit Ut shown in FIG. 1.

FIG. 3 is a block diagram of an example of a configuration of a reception side unit Ur shown in FIG. 1.

FIG. 4 is a block diagram of an example of a configuration of an image compressor 11 shown in FIG. 2, showing an example of detailed configurations of an image reduction converter 13 and a JPEG encoder 14.

FIGS. 5(*a*) and 5(*b*) show examples of a DS region division and a downsampling performed by the image compressor 11.

FIG. 6 is a block diagram of an example of a detailed configuration of a downsampling unit 131.

FIGS. 7(*a*) to 7(*c*) show an example of an operation performed by the image reduction converter 13.

FIG. 8 shows examples of a quantization table T1.

FIG. 9 is a block diagram of an example of a configuration of an image expander 21 shown in FIG. 3, showing an example of detailed configurations of a JPEG decoder 23 and an image enlargement converter 24.

FIGS. 10(*a*) to 10(*e*) show all arrangement states in a DS region if the DS region has a size of 16×16 pixels and reduced data has a size of 8×8 pixels.

FIGS. 11(*a*) to 11(*c*) show states of dividing image data into a plurality of DS regions each at a size of 32×32 pixels, downsampling part of the DS regions to reduced data each at a size of 8×8 pixels, and rearranging the reduced data.

FIGS. 12(*a*) to 12(*c*) show an example of an operation performed by an image compression and expansion system according to a third embodiment of the present invention.

FIGS. 13(*a*) to 13(*h*) show all arrangement states in a DS region if the DS region has a size of 16×16 pixels and reduced data has a size of 8×8 pixels.

FIGS. 14(*a*) to 14(*c*) and 15(*d*) to 15(*e*) show an example of an operation performed by an image compression and expansion system according to a fourth embodiment of the present invention.

FIGS. 15(*d*) and 15(*e*) show an example of the operation performed by the image compression and expansion system subsequent to FIGS. 14(*a*) to 14(*c*).

FIG. 16 shows a detailed configuration of an image reduction converter 13 according to a fifth embodiment of the present invention.

FIG. 17 is a block diagram of an example of a detailed configuration of a downsampling unit 131*s* shown in FIG. 16.

FIGS. 18(*a*) and 18(*b*) show an example of an operation performed by an image compression and expansion system according to the fifth embodiment of the present invention.

FIG. 19 shows a detailed configuration of an image enlargement converter 24 according to the fifth embodiment of the present invention.

FIGS. 20(*a*) and 20(*b*) show an example of the image data in a YUV422 format.

FIGS. 21(*a*) and 21(*b*) show an example of an operation performed by an image compression and expansion system according to a sixth embodiment of the present invention.

FIG. 22 is a block diagram of an example of a configuration of an image reduction converter 13 according to a seventh embodiment of the present invention.

FIGS. 23(*a*) to 23(*c*) show an example of an operation up to an unreduced data dividing processing performed in the image reduction converter 13 shown in FIG. 22.

FIGS. 24(a) and 24(b) show an example of an operation performed by a rearrangement unit 132s shown in FIG. 22.

FIG. 25 shows an example of image data in which important regions and unimportant regions repeatedly appear in a horizontal direction.

FIGS. 26(a) and 26(b) show output data if the image data shown in FIG. 25 is input to the image reduction converter 13 according to the sixth embodiment and that according to the seventh embodiment, respectively.

DESCRIPTION OF REFERENCE NUMERALS

13 Image reduction converter
14 JPEG encoder
23 JPEG decoder
24 Image enlargement converter
130 DS region divider
131, 131s Downsampling unit
132, 132s Rearrangement unit
134 Unreduced data divider
140 Block divider
141 DCT processor
142 Quantizer
143 Coding unit
T1 Quantization table
T2 Code table
230 Decoding unit
231 Dequantizer
232 Inverse DCT processor
240 DS region divider
241, 241s Arrangement restoring unit
242 Interpolation processor

The invention claimed is:

1. An image compression apparatus comprising:
downsampling region dividing means for dividing image data into downsampling regions each at a size that is an integer multiple of a block size;
downsampling means for performing downsampling on at least a part of said downsampling regions to decrease the number of pixels thereof, and for generating reduced data each at a size that is an integer multiple of said block size;
rearranging means for arranging two or more pieces of said reduced data in each of said downsampling regions subjected to said downsampling, for inserting fill data into each of pixels left in said downsampling region in which said reduced data is arranged, and for removing said downsampling regions in which said reduced data is not arranged; and
data compressing means for dividing image data generated by said rearranging means into block regions each at said block size, and for performing a compression processing including an orthogonal transform and a quantization on each of said block regions, thereby generating compressed image data, wherein
said downsampling region dividing means divides said image data into said downsampling regions having different sizes, and
said downsampling means performs said downsampling at different compression rates according to said sizes of said downsampling regions, thereby generates said reduced data equal in size.

2. An image compression apparatus comprising:
downsampling region dividing means for dividing image data into downsampling regions each at a size that is an integer multiple of a block size;
downsampling means for performing downsampling on at least a part of said downsampling regions to generate reduced data, for collecting said reduced data to generate a new downsampling region, and for performing said downsampling again on said new downsampling region, thereby generating new reduced data each at a size that is an integer multiple of said block size;
rearranging means for arranging two or more pieces of said reduced data in each of said downsampling regions subjected to said downsampling, for inserting fill data into each of pixels left in said downsampling region in which said reduced data is arranged, and for removing said downsampling regions in which said reduced data is not arranged; and
data compressing means for dividing image data generated by said rearranging means into block regions each at said block size, and for performing a compression processing including an orthogonal transform and a quantization on each of said block regions, thereby generating compressed image data.

3. An image compression apparatus comprising:
downsampling region dividing means for dividing luminance data that constitute image data into luminance downsampling regions each at a size that is an integer multiple of a block size, and for dividing color-difference data that constitute said image data into color-difference downsampling regions each at a size that is the integer multiple of said block size;
luminance downsampling means for performing downsampling on at least a part of said luminance downsampling regions to decrease the number of said luminance data, and for generating reduced luminance data each at a size that is an integer multiple of said block size;
luminance data rearranging means for arranging two or more pieces of said reduced luminance data in each of said luminance downsampling regions subjected to said luminance downsampling, and for inserting fill data into each of pixels left in said luminance downsampling region in which said reduced luminance data is arranged;
color-difference downsampling means for performing downsampling on said color-difference downsampling regions determined based on said luminance downsampling regions subjected to said luminance downsampling to decrease the number of said color-difference data, and for generating reduced color-difference data each at a size that is the integer multiple of said block size;
color-difference data rearranging means for arranging two or more pieces of said reduced color-difference data in each of said color-difference downsampling regions;
data compressing means for dividing said luminance data and said color-difference data generated by said luminance data rearranging means and said color-difference data rearranging means, respectively, into block regions each at said block size, and for performing a compression processing including an orthogonal transform and a quantization on each of said block regions, thereby generating compressed image data, wherein
said luminance data rearranging means arranges said reduced luminance data in each of said luminance downsampling regions while leaving a discrimination region having said block size at a predetermined position in each of said luminance downsampling regions.

4. The image compression apparatus according to claim 3, further comprising:

unreduced data dividing means for dividing each of said color-difference downsampling regions that are not subjected to the downsampling into regions each at a size equal to said reduced color-difference data, thereby generating divided color-difference data, wherein said color-difference data rearranging means rearranges said reduced color-difference data and said divided color-difference data.

* * * * *